United States Patent
Jones

(10) Patent No.: US 8,167,561 B2
(45) Date of Patent: May 1, 2012

(54) HELICOPTER AIRCRAFT VEHICLE ROTOR DAMPER

(75) Inventor: Peter Jones, Erie, PA (US)

(73) Assignee: Lord Corporation, Cary, NC (US)

( * ) Notice: Subject to any disclaimer, the term of this patent is extended or adjusted under 35 U.S.C. 154(b) by 910 days.

(21) Appl. No.: 12/203,288

(22) Filed: Sep. 3, 2008

(65) Prior Publication Data
US 2009/0110555 A1 Apr. 30, 2009

Related U.S. Application Data

(60) Provisional application No. 60/969,807, filed on Sep. 4, 2007.

(51) Int. Cl.
| | |
|---|---|
| B63H 1/06 | (2006.01) |
| B63H 5/125 | (2006.01) |
| B64C 11/12 | (2006.01) |
| B64C 11/28 | (2006.01) |
| F01D 5/00 | (2006.01) |

(52) U.S. Cl. ............. 416/140; 416/134 A; 244/131
(58) Field of Classification Search ............. 416/140, 416/107, 106, 134 A, 500; 244/131
See application file for complete search history.

(56) References Cited

U.S. PATENT DOCUMENTS

| | | | |
|---|---|---|---|
| 2,155,427 A | 4/1939 | Larsen | |
| 2,696,271 A | 12/1954 | Jovanovich | |
| 3,758,230 A | 9/1973 | Potter | |
| 4,105,365 A | 8/1978 | Ferris et al. | |
| 4,419,051 A | 12/1983 | DeRosa | |
| 4,452,569 A | 6/1984 | Stephan et al. | |
| 4,645,423 A | 2/1987 | Ferris et al. | |
| 4,768,630 A | 9/1988 | Aubry et al. | |
| 4,804,352 A | 2/1989 | Schmidt | |
| 4,874,292 A | 10/1989 | Matuska et al. | |
| 5,141,398 A * | 8/1992 | Bietenhader et al. | 416/107 |
| 5,186,686 A | 2/1993 | Staples et al. | |
| 5,266,005 A | 11/1993 | Aubry | |
| 5,407,325 A | 4/1995 | Aubry | |
| 6,305,640 B1 | 10/2001 | Bansemir | |

(Continued)

FOREIGN PATENT DOCUMENTS
EP 0306027 A2 3/1989
(Continued)

OTHER PUBLICATIONS

Brackbill et al., "Thermomechanical Modeling of Elastomeric Materials", Smart Mater. Struct., 5 (1996). pp. 529-539.
(Continued)

*Primary Examiner* — David Nhu
(74) *Attorney, Agent, or Firm* — Richard G. Miller

(57) ABSTRACT

A helicopter rotor damper system including a torsional damper with a damper centering bearing providing a damper center of rotation axis, a first elastomeric torsional damper with a first elastomeric torsional damper torsional elastomer bonded between a first elastomeric torsional damper first torsional damper nonelastomeric bonding surface and a first elastomeric torsional damper second torsional damper nonelastomeric bonding surface, and a second elastomeric torsional damper with a second elastomeric torsional damper torsional elastomer bonded between a second elastomeric torsional damper first torsional damper nonelastomeric bonding surface and a second elastomeric torsional damper second torsional damper nonelastomeric bonding surface. The helicopter rotor damper system includes a damper link linked with the torsional damper, with the torsional damper and the damper link connected between a helicopter blade and a helicopter rotor with the elastomeric torsional damper nonelastomeric bonding surfaces relatively rotating.

56 Claims, 28 Drawing Sheets

U.S. PATENT DOCUMENTS

| | | | |
|---|---|---|---|
| 6,676,074 B2 * | 1/2004 | Zoppitelli et al. | 244/17.11 |
| 6,764,280 B2 * | 7/2004 | Sehgal et al. | 416/104 |
| 6,899,208 B2 | 5/2005 | VanValkenburgh et al. | |
| 6,926,500 B2 | 8/2005 | Ferullo | |
| 6,955,249 B2 | 10/2005 | Biasiotto et al. | |
| 7,066,308 B2 | 6/2006 | Kanno et al. | |
| 7,137,624 B2 | 11/2006 | Russell et al. | |
| 7,204,353 B2 | 4/2007 | Kanno et al. | |
| 7,270,321 B2 | 9/2007 | Russell | |
| 2008/0023586 A1 * | 1/2008 | Russell | 244/131 |

FOREIGN PATENT DOCUMENTS

| | | |
|---|---|---|
| EP | 0615904 B1 | 9/1994 |
| EP | 1566563 A1 | 8/2005 |

OTHER PUBLICATIONS

McGuire, "Fluidlastic Dampers and Isolators for Vibration Control in Helicopters", LORD Corporation, LL-6502, 2001.

PCT International Search Report and Written Opinion for PCT International Application No. PCT/US08/75099.

* cited by examiner

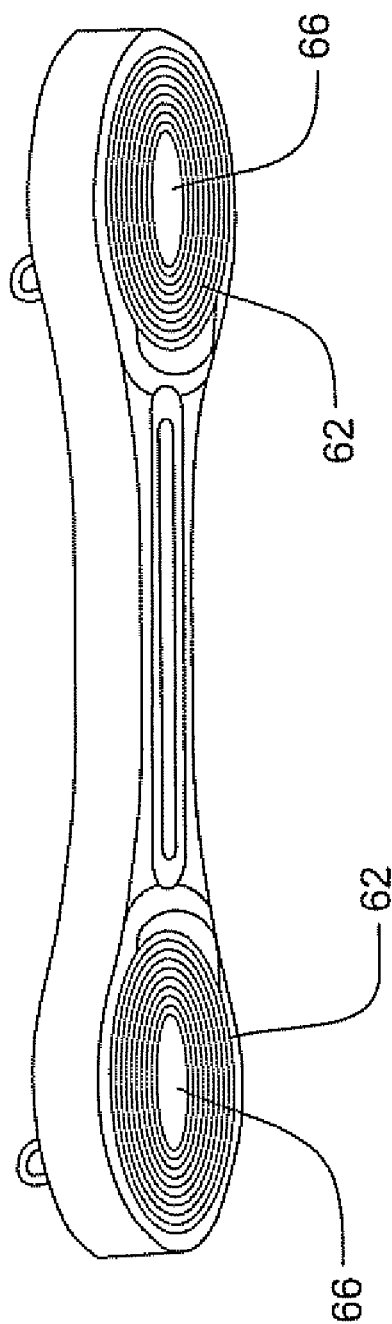
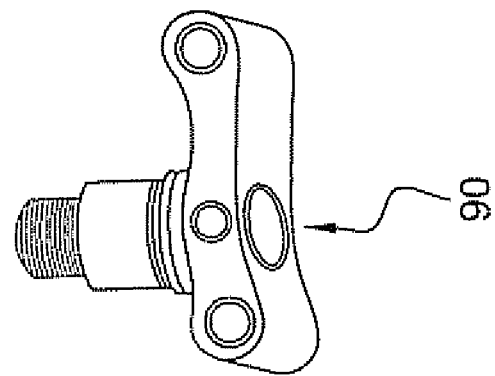
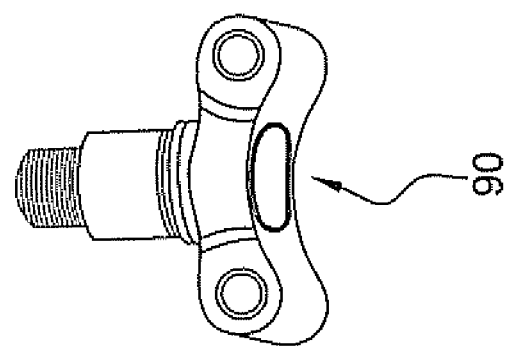
FIG. 11

HELICOPTER AIRCRAFT VEHICLE ROTOR DAMPER

CROSS REFERENCE

This application claims the benefit of, and incorporates by reference, U.S. Provisional Patent Application No. 60/969,807 filed on Sep. 4th, 2007.

FIELD OF THE INVENTION

The invention relates to the field of damper devices and damper systems. The invention relates to the field of aircraft helicopter vehicle damper systems and link systems. More particularly the invention relates to the field of helicopter rotor dampers, damper systems, link systems, methods of making helicopter rotor damper systems, methods of controlling helicopter rotor motion, making helicopter rotor damper systems, and damper systems for damping motion of moving members.

SUMMARY OF THE INVENTION

In an embodiment the invention includes a helicopter rotor damper system for damping a motion of a helicopter blade relative to a helicopter rotor. The helicopter rotor damper system includes a torsional damper with a damper centering bearing providing a damper center of rotation axis. The torsional damper includes at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The torsional damper includes at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The helicopter rotor damper system includes a damper link, the damper link linked at a first linkend with the torsional damper, wherein the torsional damper and the damper link are connected between the helicopter blade and the helicopter rotor with the first elastomeric torsional damper first torsional damper nonelastomeric bonding surface rotating relative to the first elastomeric torsional damper second torsional damper nonelastomeric bonding surface about the damper center of rotation axis, and the second elastomeric torsional damper first torsional damper nonelastomeric bonding surface rotating relative to the second elastomeric torsional damper second torsional damper nonelastomeric bonding surface about the damper center of rotation axis.

In an embodiment the invention includes a damper including a damper centering bearing providing a damper center of rotation axis. The damper including at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The damper including at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis.

In an embodiment the invention includes an aircraft link system. The aircraft link system includes a longitudinally extending link, the longitudinally extending link having a longitudinal link axis with the link having a first linkend and a distal second linkend. The first linkend is comprised of a nonelastomeric outer link housing member, the first linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims. A first cantilever connector provides a cantileved connection between the first linkend nonelastomeric inner member and a first aircraft member.

In an embodiment the invention includes a method of making a damper system. The method includes providing a damper centering bearing providing a damper center of rotation axis. The method includes providing at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The method includes providing at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The method includes centering the at least first elastomeric torsional damper and the at least second elastomeric torsional damper to rotate about the damper center of rotation axis. The method includes providing a damper link. The method includes connecting the damper link with the at least first elastomeric torsional damper and the at least second elastomeric torsional damper wherein the first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis.

In an embodiment the invention includes a method of controlling a vehicle motion. The method includes providing a damper, the damper including a damper centering bearing providing a damper center of rotation axis, at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, and at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, the at least first elastomeric torsional damper and the at least second elastomeric torsional damper rotating about the damper center of rotation axis. The method includes providing a damper link. The method includes connecting the damper link with the damper wherein the first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis.

In an embodiment the invention includes a damper system for damping a motion of a moving member. The damper system including a torsional damper with a means for providing a damper center of rotation axis. The damper system including at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The damper system including at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The damper system preferably including a means for linking the torsional damper with the moving member, wherein the torsional damper is connected with the moving member with the first elastomeric torsional damper first torsional damper nonelastomeric bonding surface rotating relative to the first elastomeric torsional damper second torsional damper nonelastomeric bonding surface, and the second elastomeric torsional damper first torsional damper nonelastomeric bonding surface rotating relative to the second elastomeric torsional damper second torsional damper nonelastomeric bonding surface.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 11 illustrates a damper system damper link with connectors separated from the damper link.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a helicopter rotor damper system for damping a motion of a helicopter blade relative to a helicopter rotor. The helicopter rotor damper system includes a torsional damper with a damper centering bearing providing a damper center of rotation axis. The torsional damper includes at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The torsional damper includes at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The helicopter rotor damper system includes a damper link, the damper link linked at a first linkend with the torsional damper, wherein the torsional damper and the damper link are connected between the helicopter blade and the helicopter rotor with the first elastomeric torsional damper first torsional damper nonelastomeric bonding surface rotating relative to the first elastomeric torsional damper second torsional damper nonelastomeric bonding surface about the damper center of rotation axis, and the second elastomeric torsional damper first torsional damper nonelastomeric bonding surface rotating relative to the second elastomeric torsional damper second torsional damper nonelastomeric bonding surface about the damper center of rotation axis.

Figure 1:
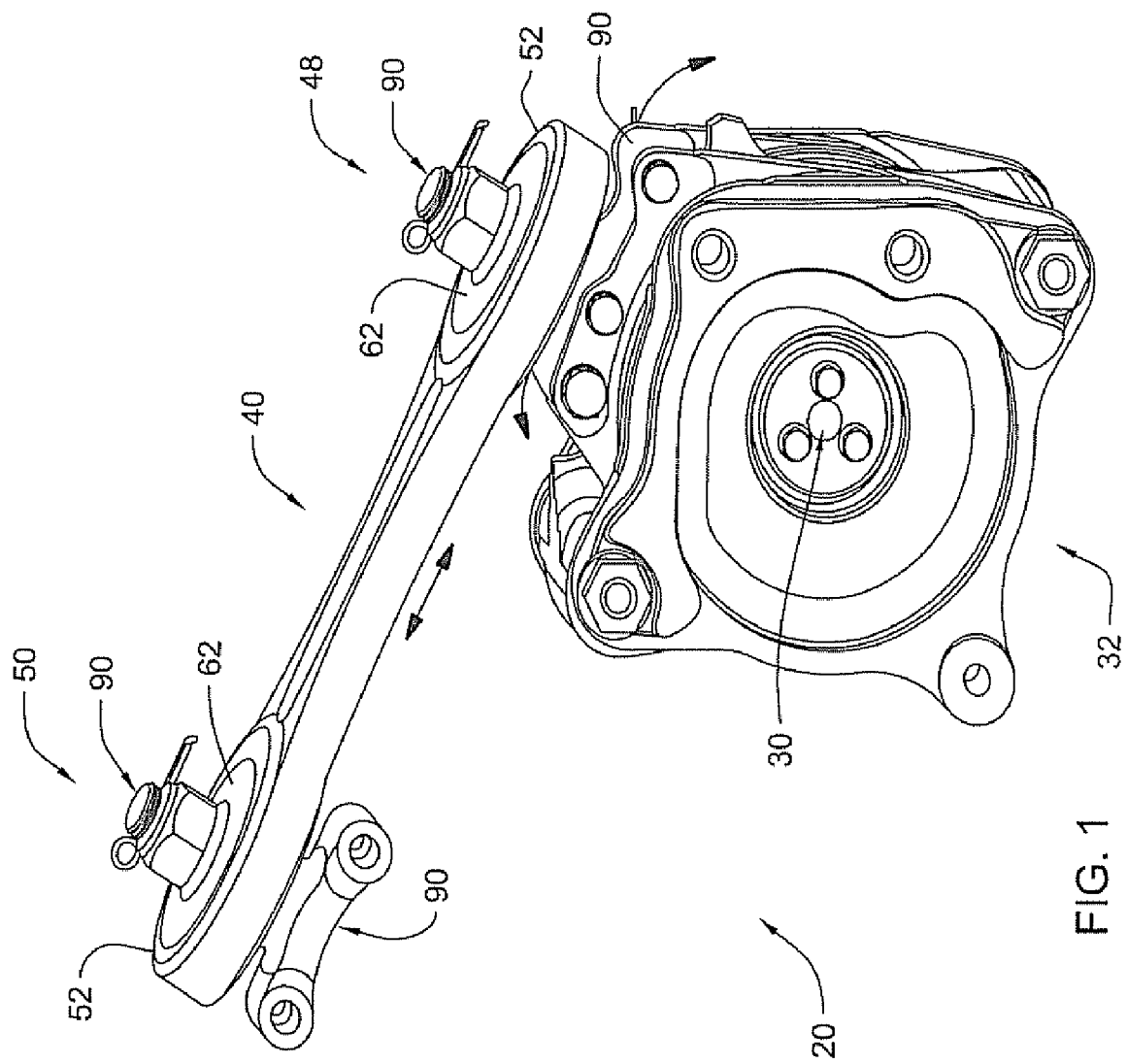
FIG. 1 illustrates a helicopter rotor damper system.
Figure 2:
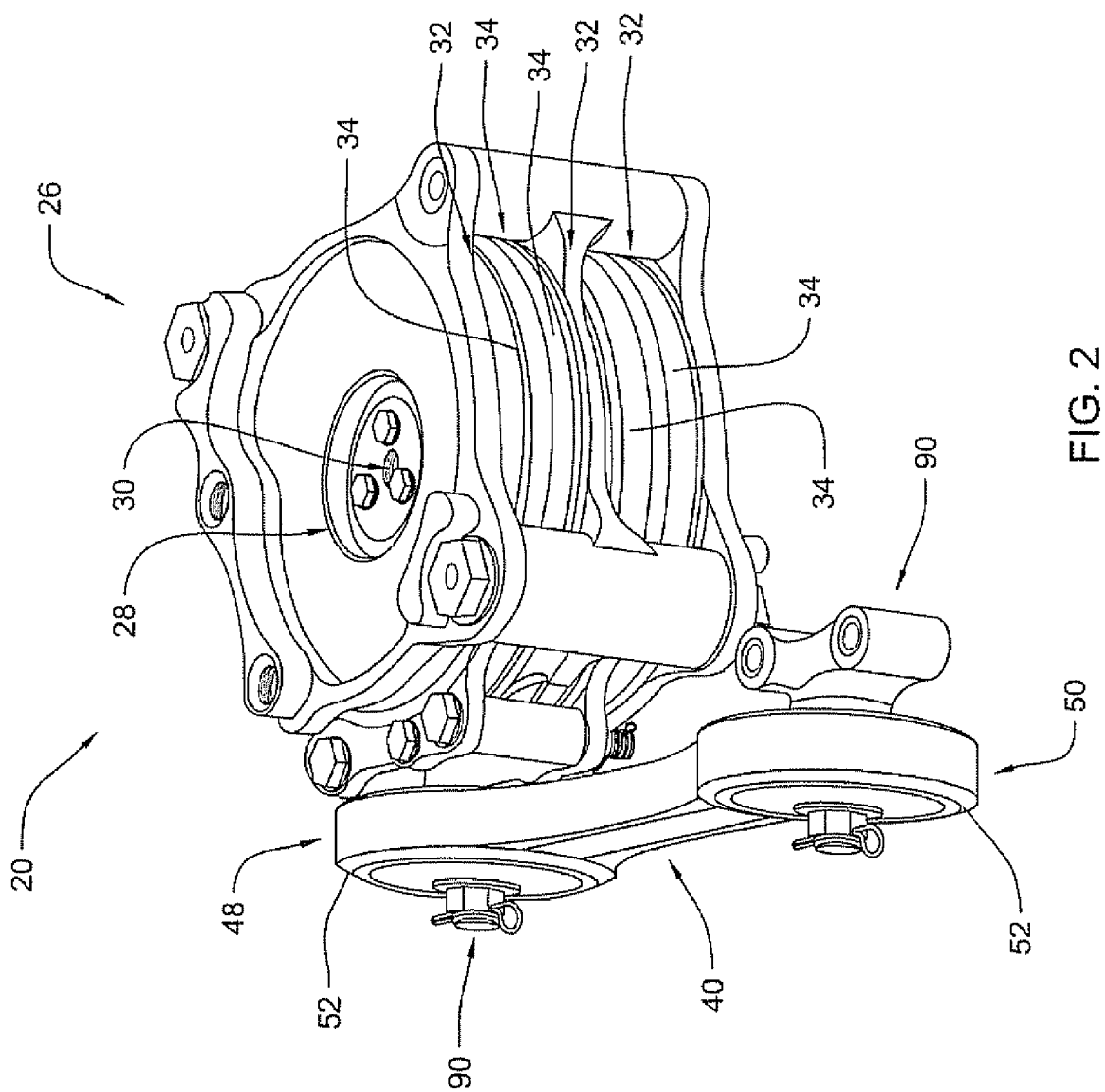
FIG. 2 illustrates a helicopter rotor damper system.
Figure 3:
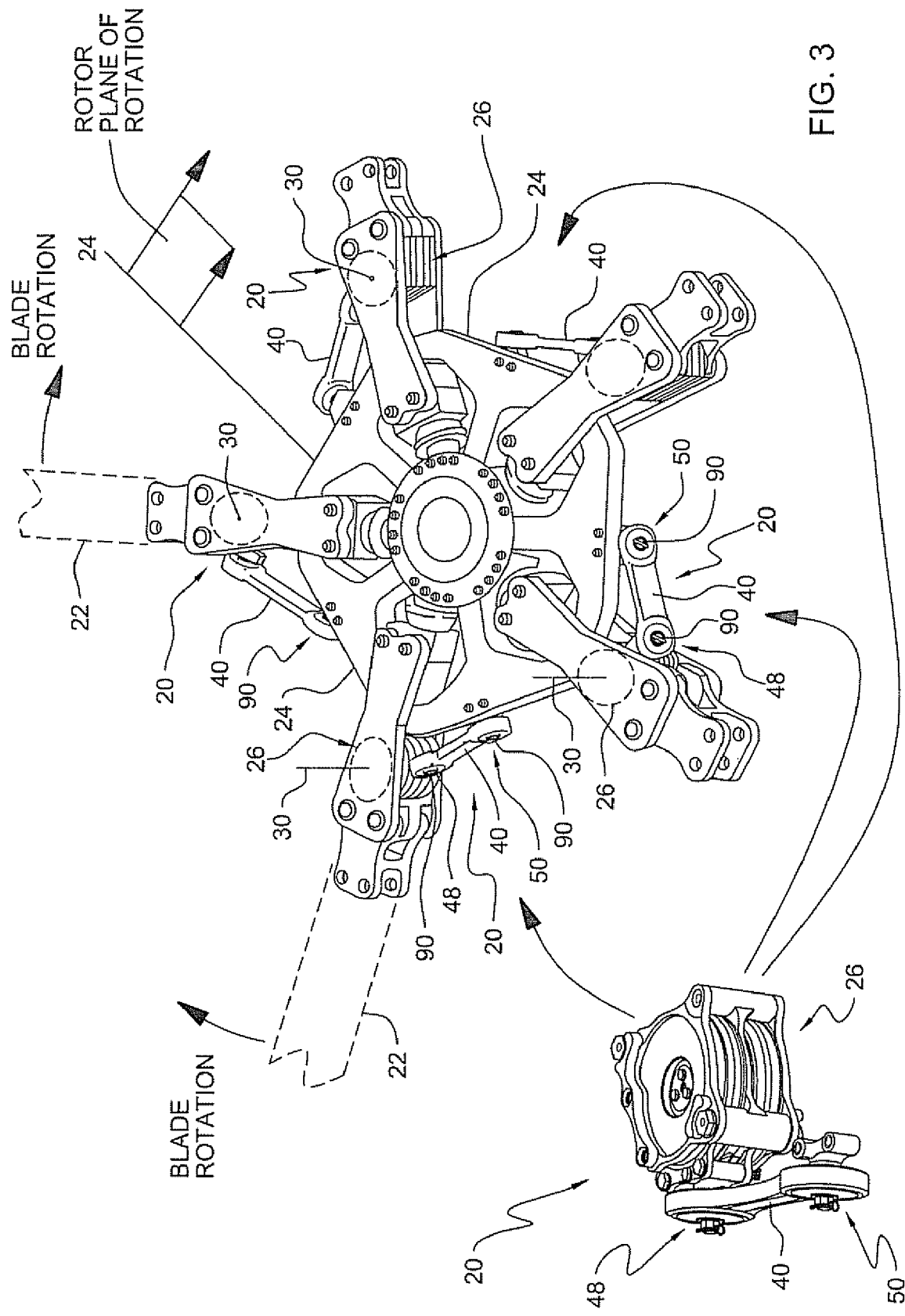
FIG. 3 illustrates a aircraft vehicle helicopter blade rotor system with rotor damper systems.
Figure 4:
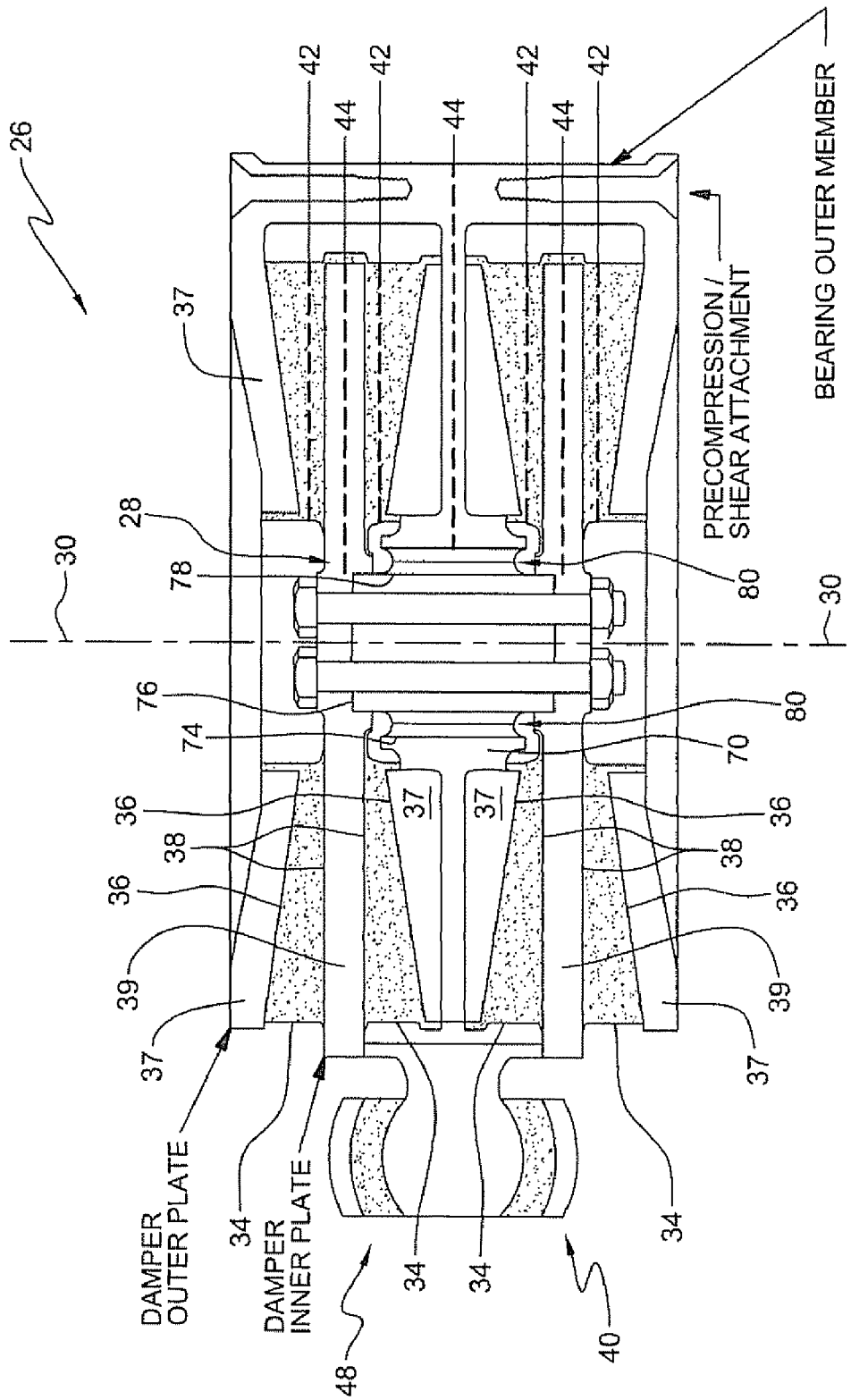
FIG. 4 illustrates a helicopter rotor damper system with a cross-section of a torsional damper and a damper link.
Figure 5:
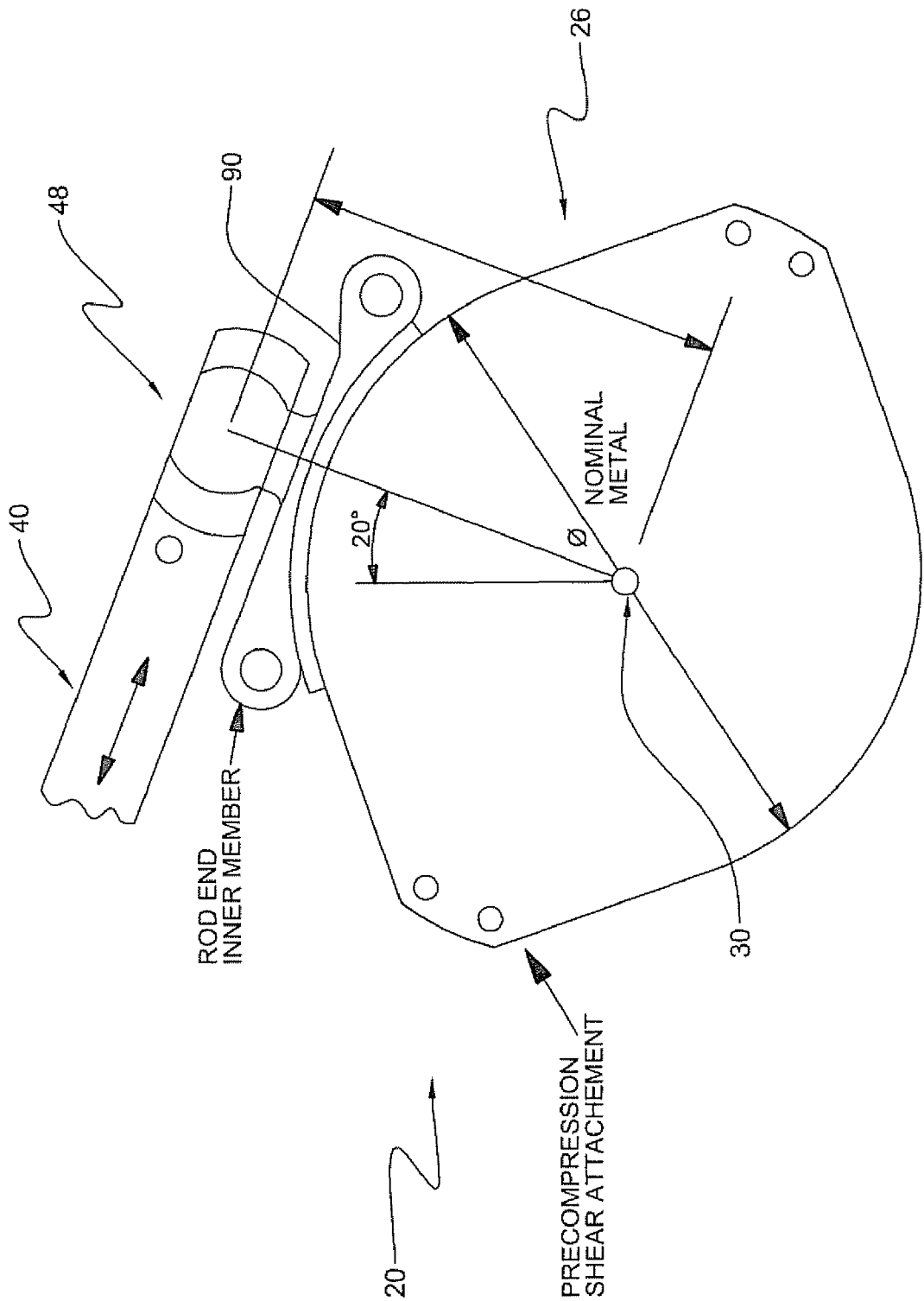
FIG. 5 illustrates a damper system with a torsional damper and a damper link.
Figure 6:
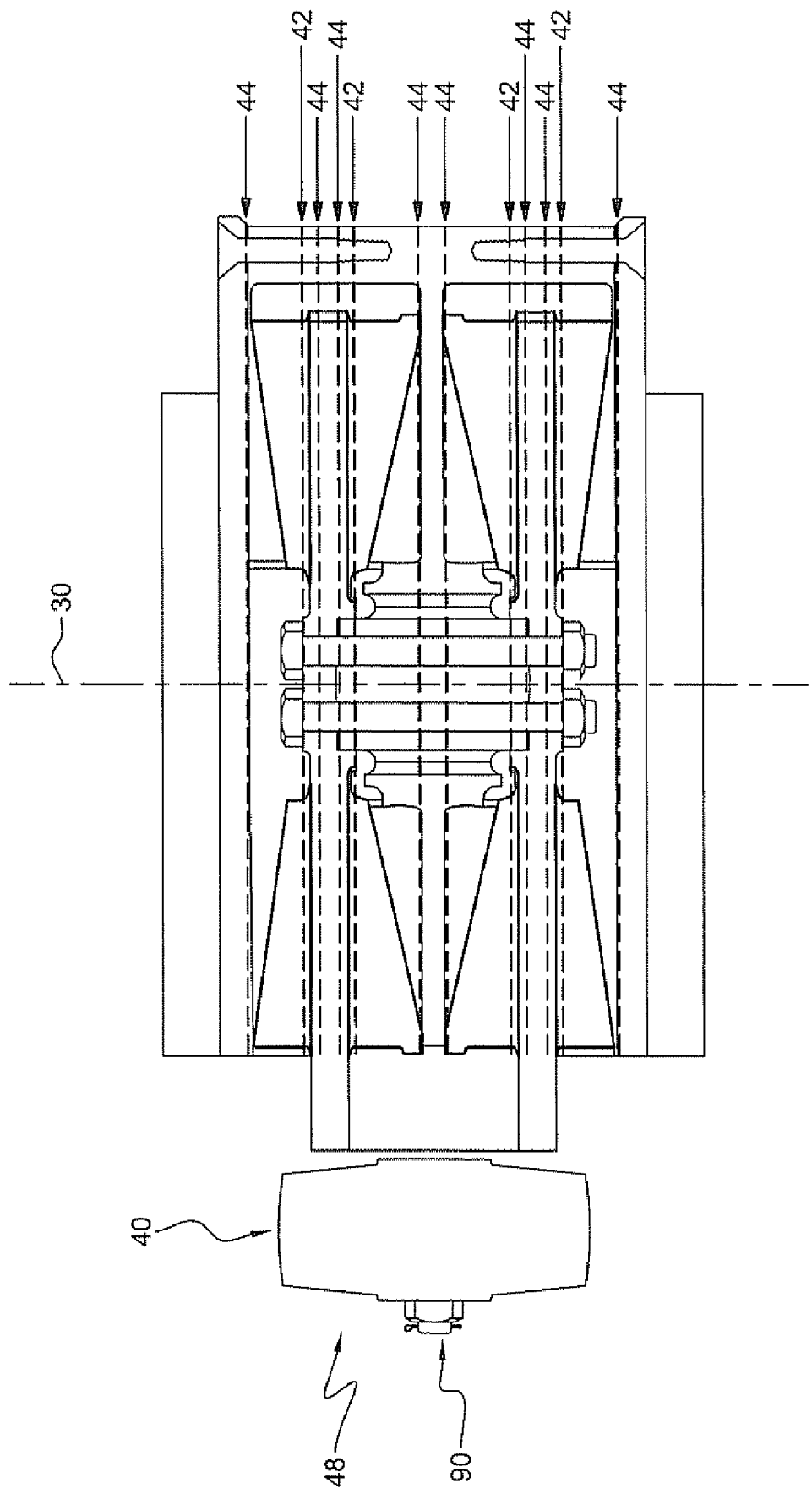
FIG. 6 illustrates a damper system with a torsional damper and a damper link with a wire skeleton view showing elastomer twist planes and support structure twist planes in the torsional damper.
Figure 7:
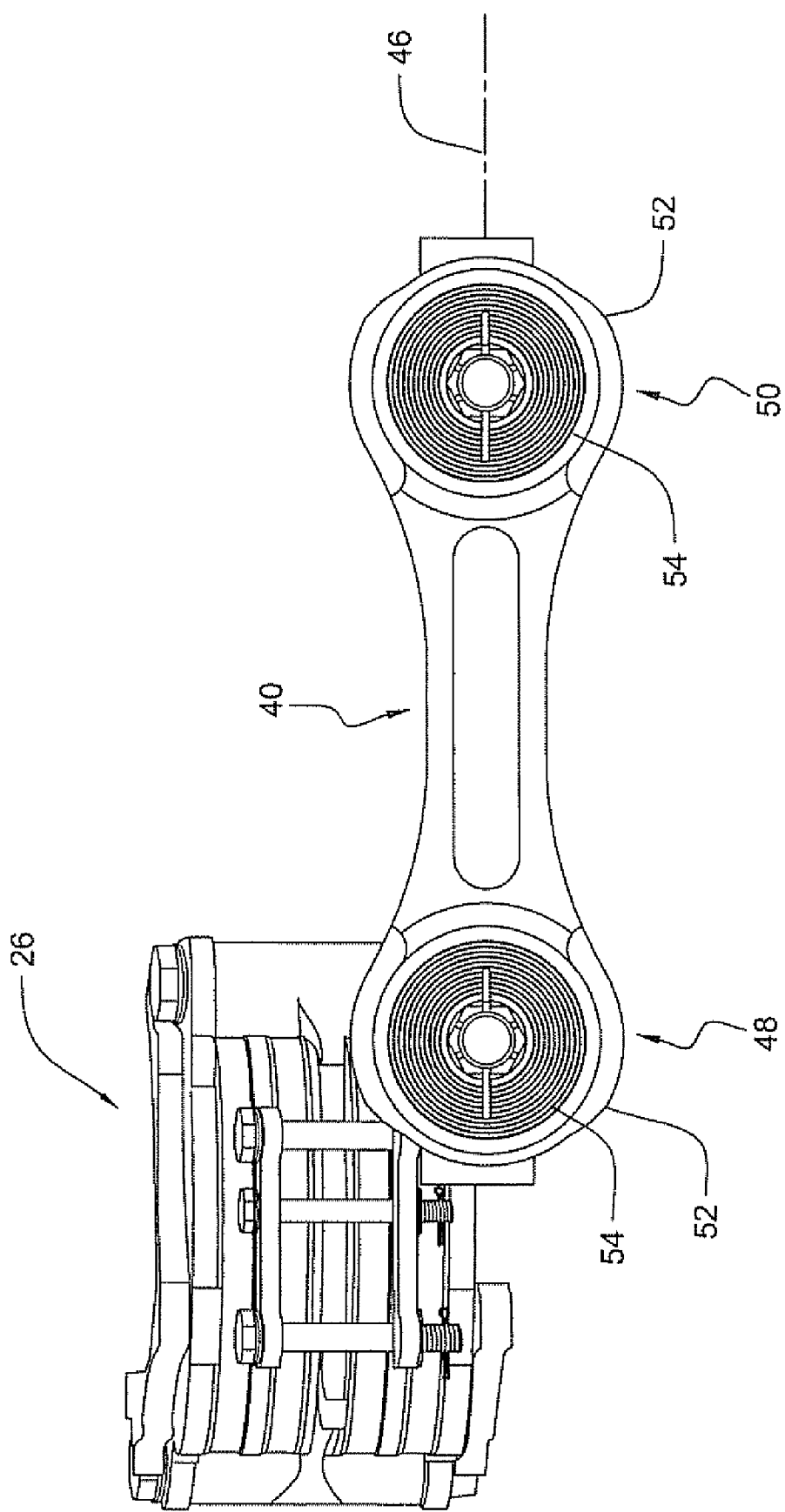
FIG. 7 illustrates a damper system with the damper link separated from the torsional damper.
Figure 8:
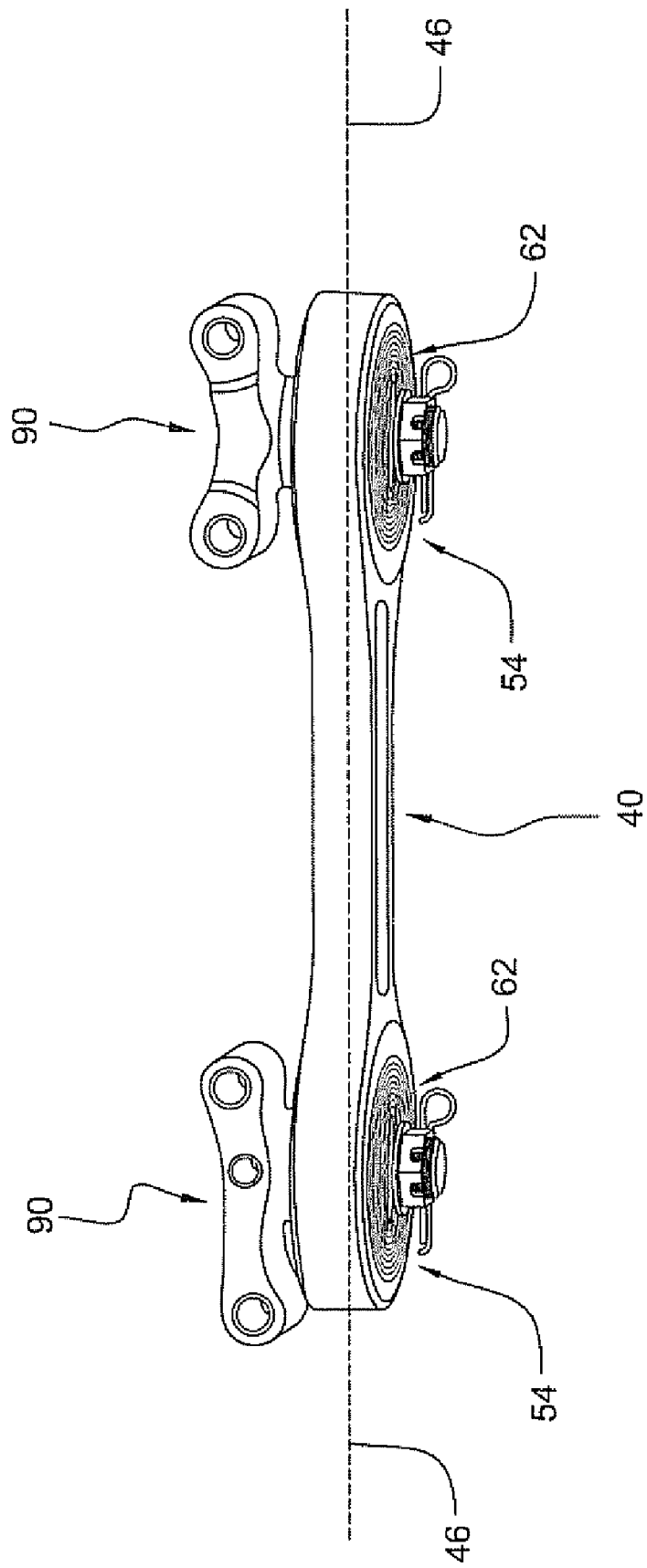
FIG. 8 illustrates a damper system damper link.
Figure 9:
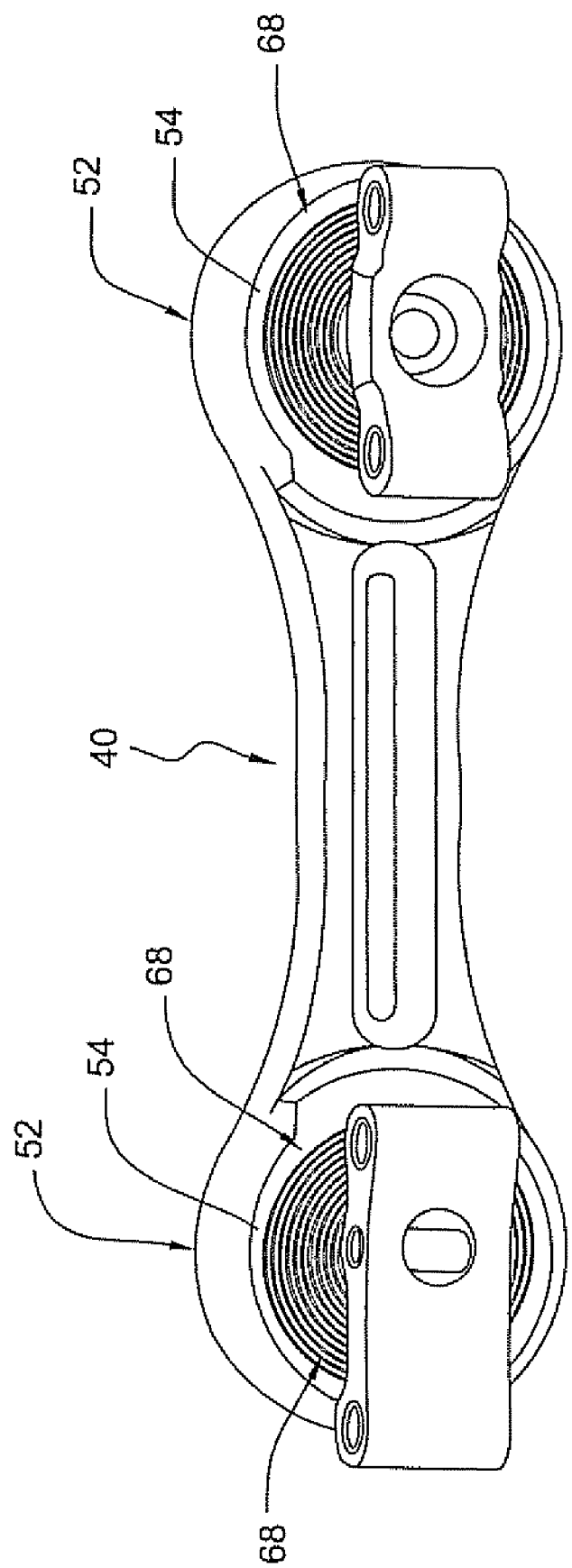
FIG. 9 illustrates a damper system damper link.
Figure 10:
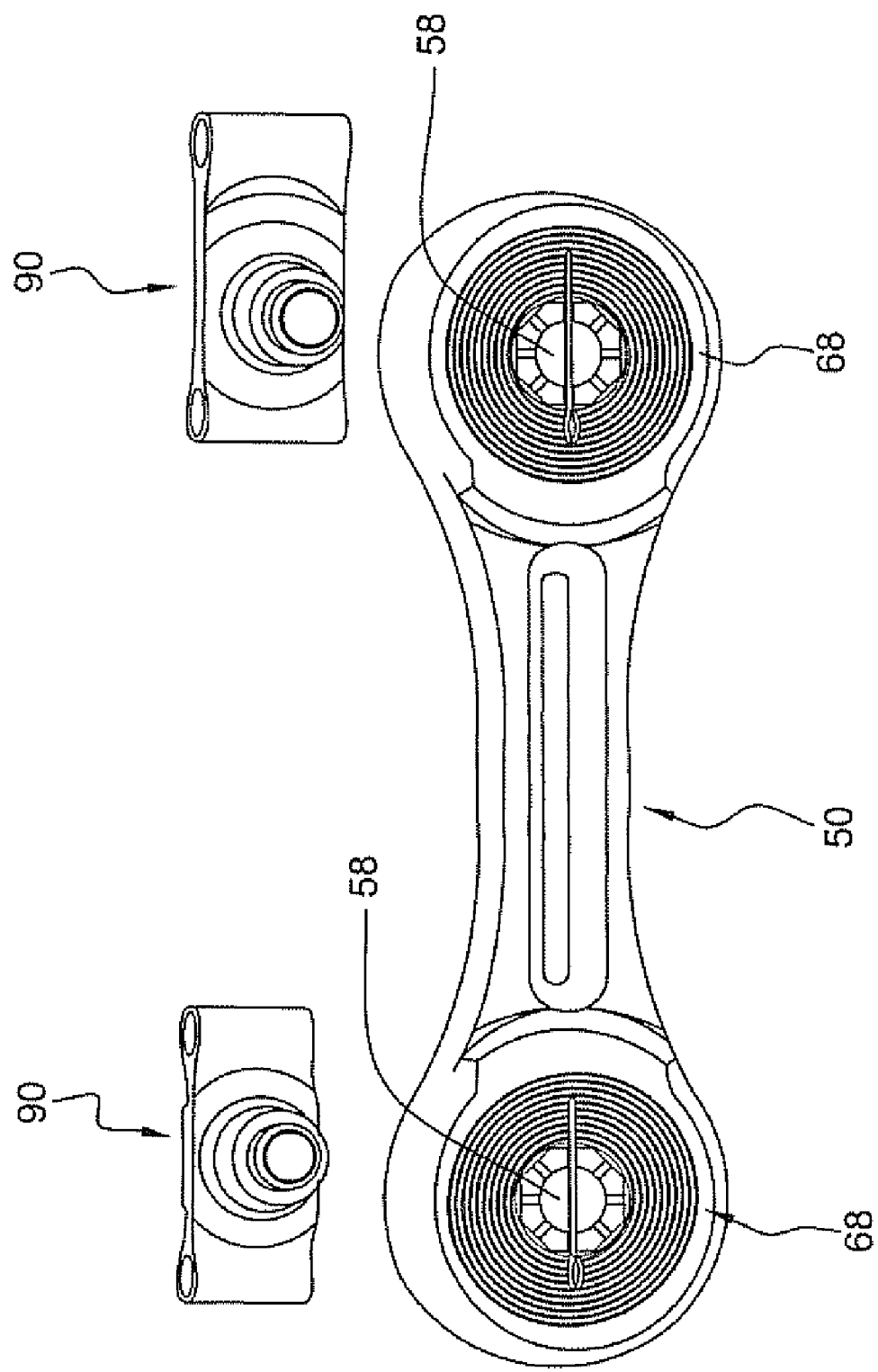
FIG. 10 illustrates a damper system damper link with connectors separated from the damper link.
Figure 12:
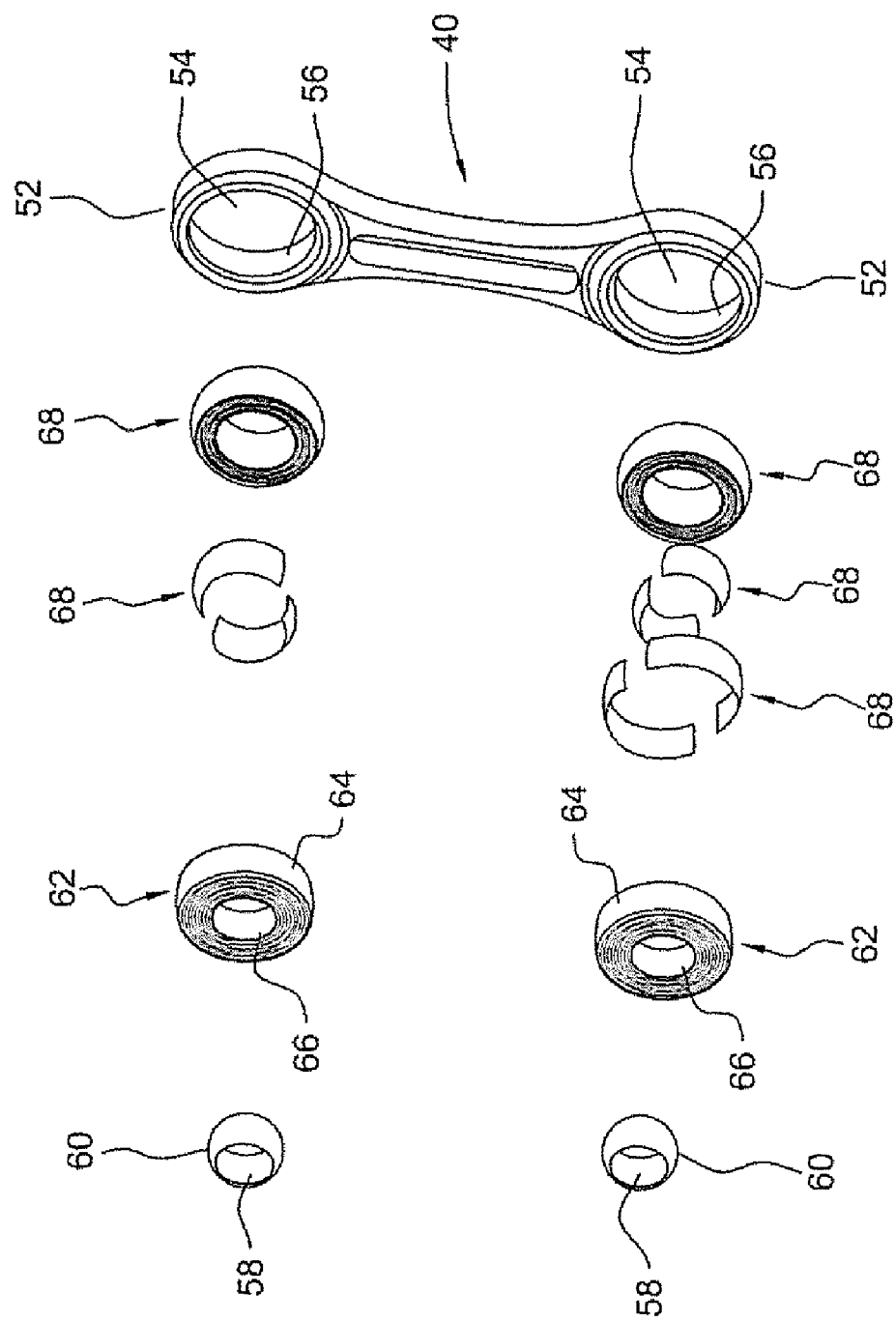
FIG. 12 illustrates a damper system damper link with exploded views of the linkend components.
Figure 13:
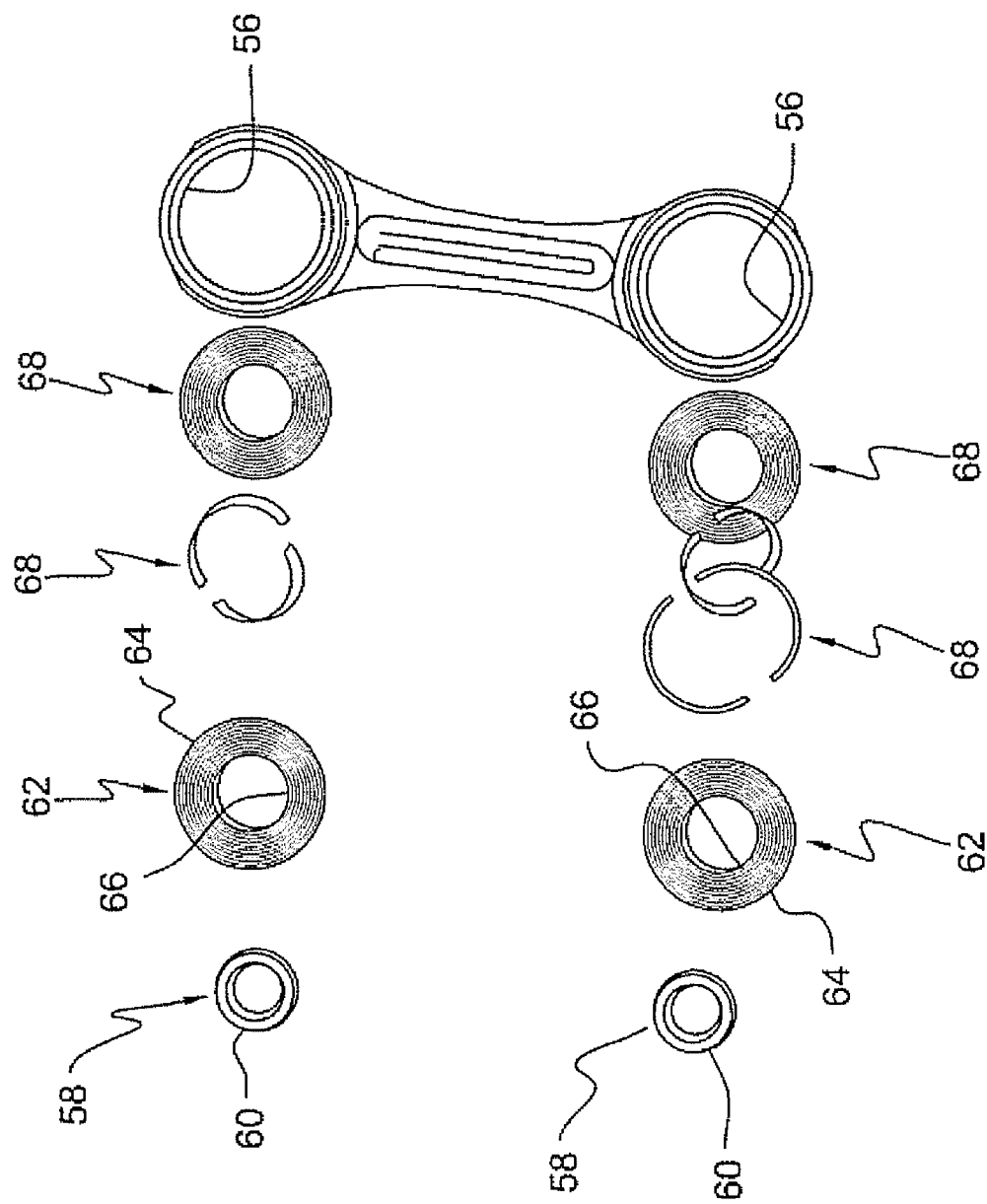
FIG. 13 illustrates a damper system damper link with exploded views of the linkend components.
Figure 14:
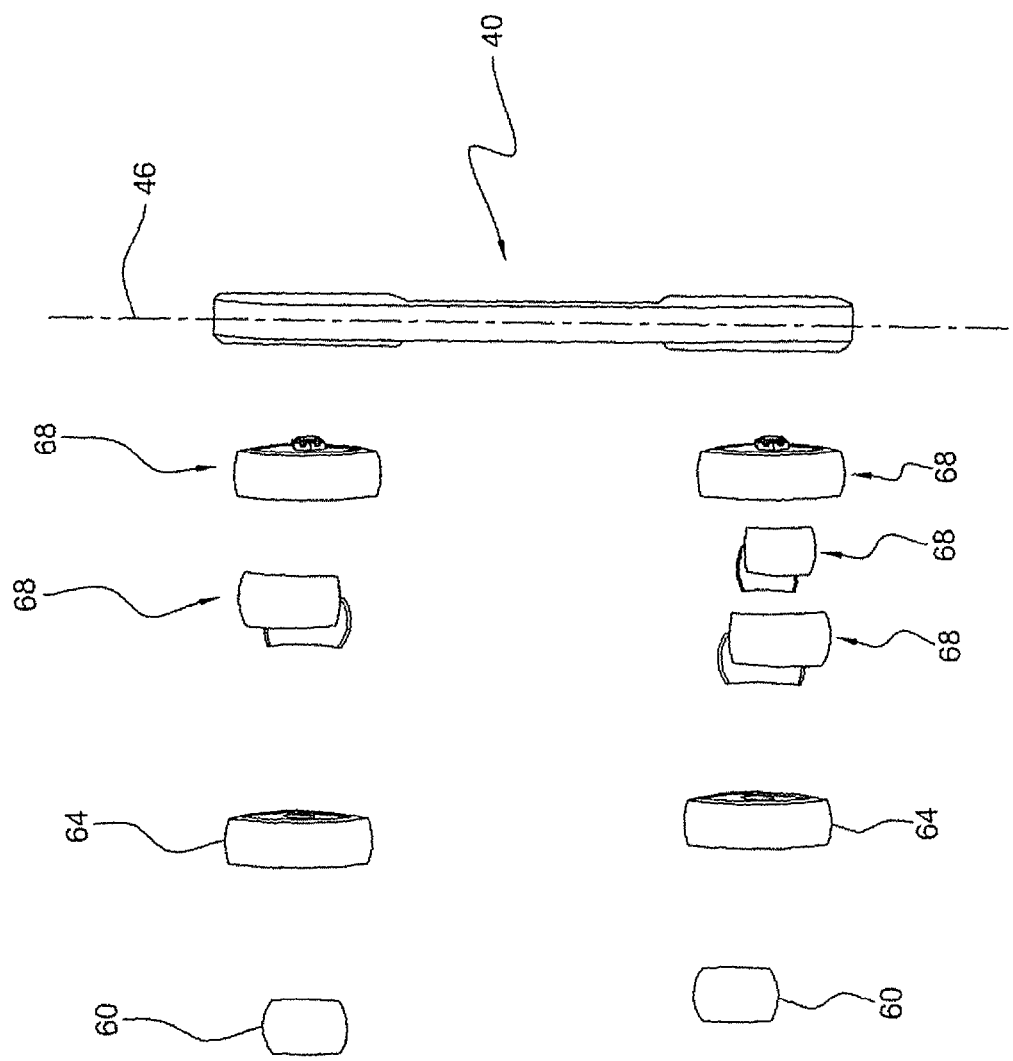
FIG. 14 illustrates a damper system damper link with exploded views of the linkend components.
Figure 15:
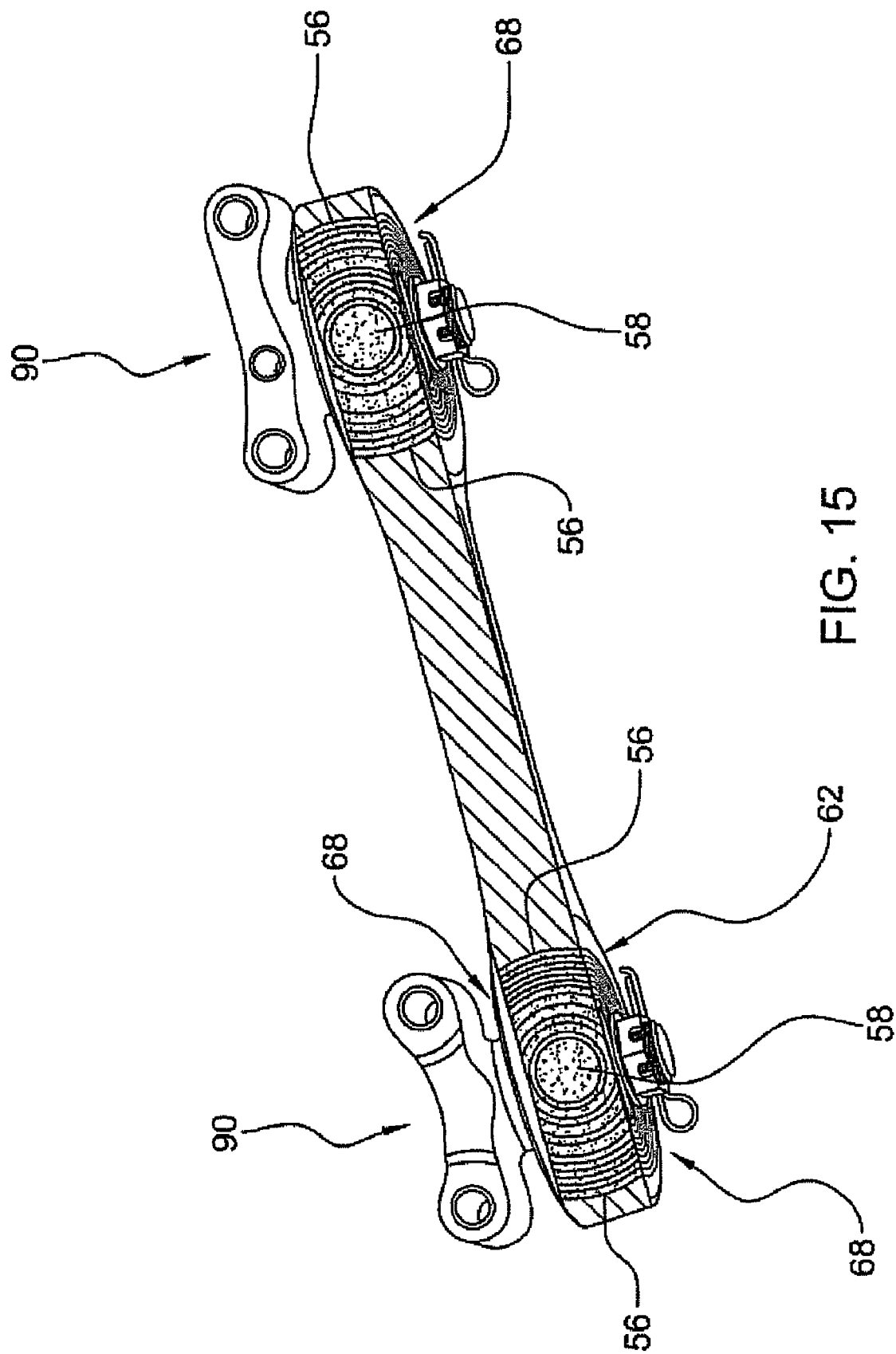
FIG. 15 illustrates a damper system damper link with a cross-section view of the linkend components.
Figure 16:
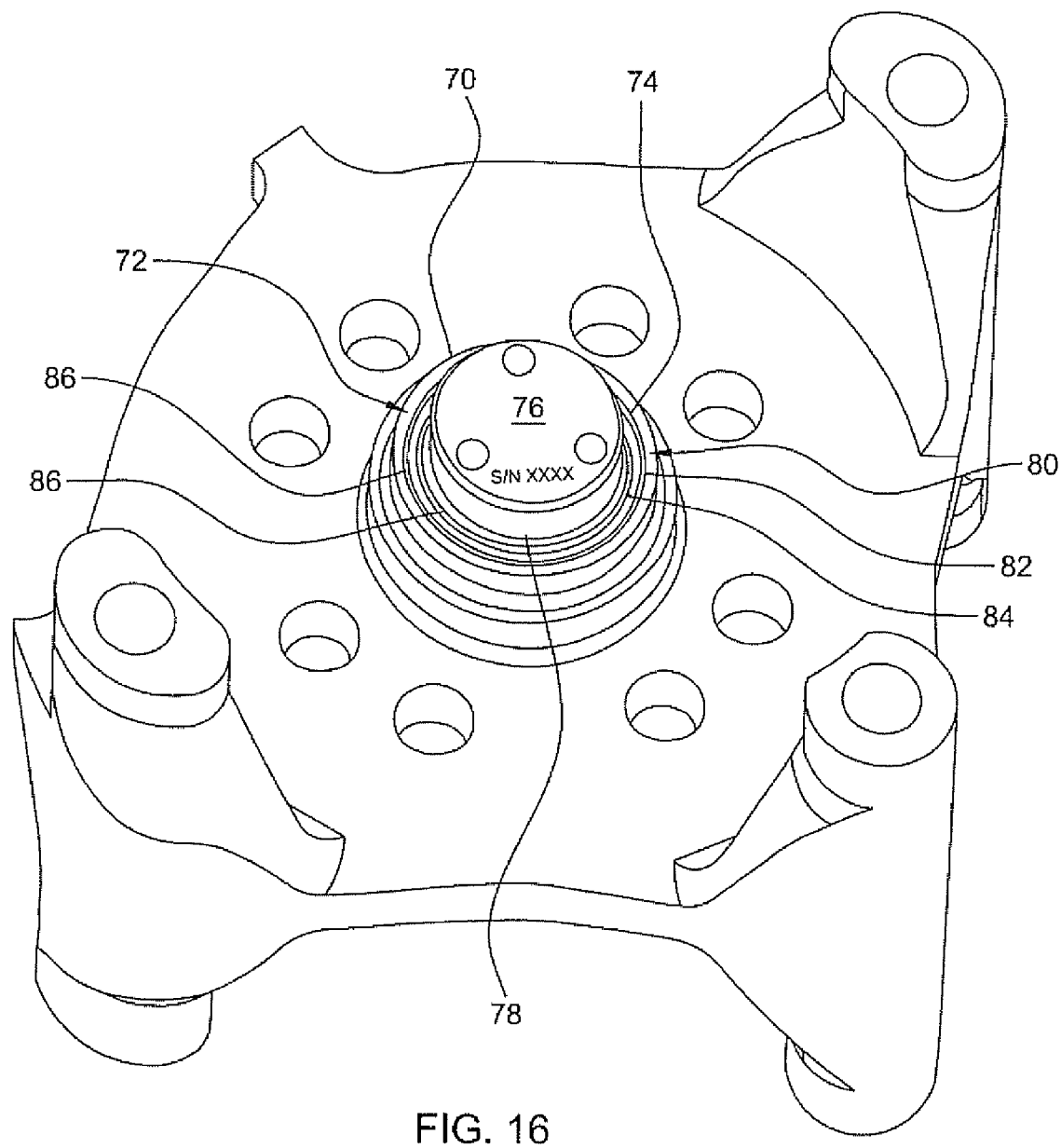
FIG. 16 illustrates a damper system torsional damper centering bearing.
Figure 17:
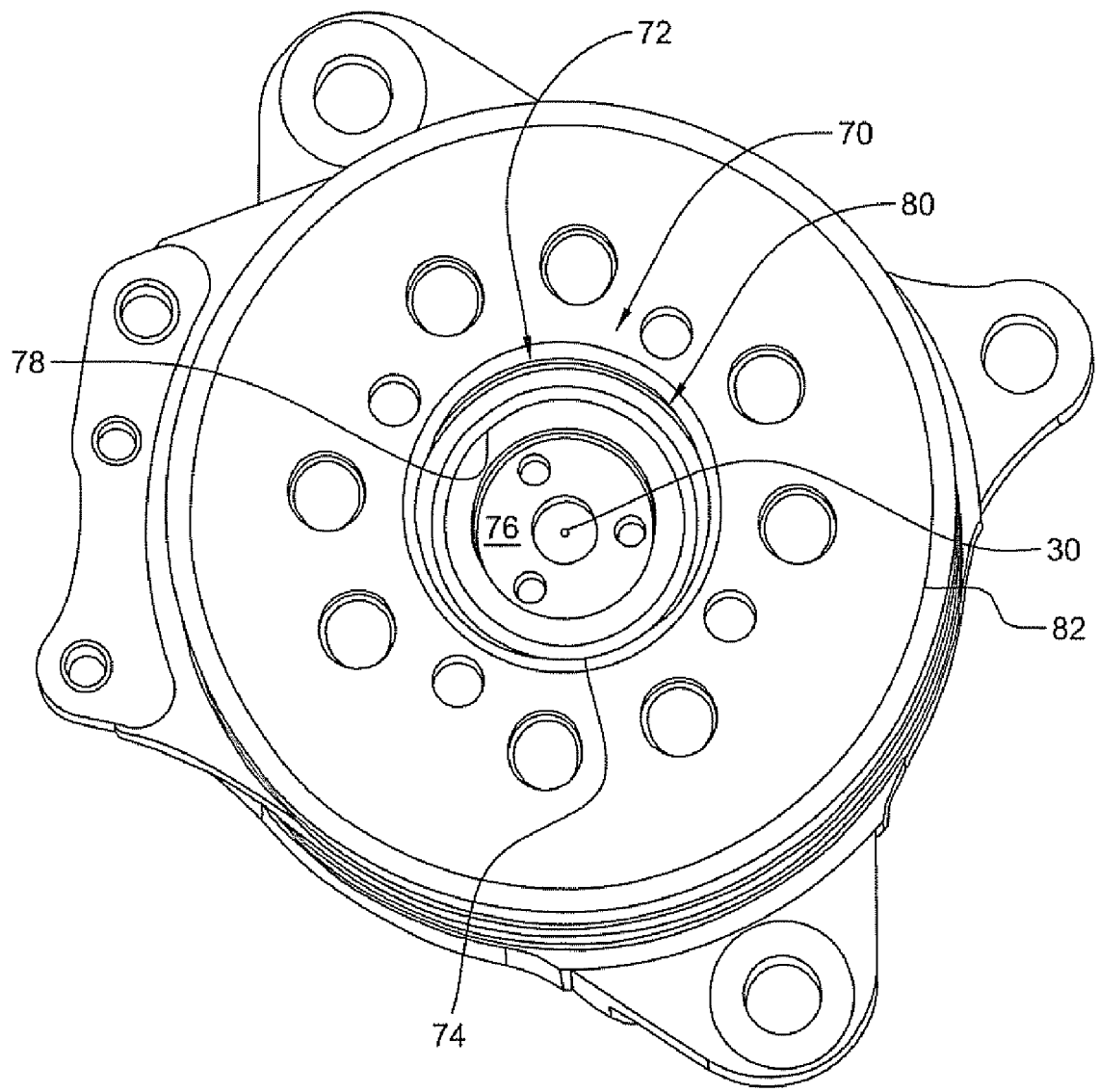
FIG. 17 illustrates a damper system torsional damper centering bearing.
Figure 18:
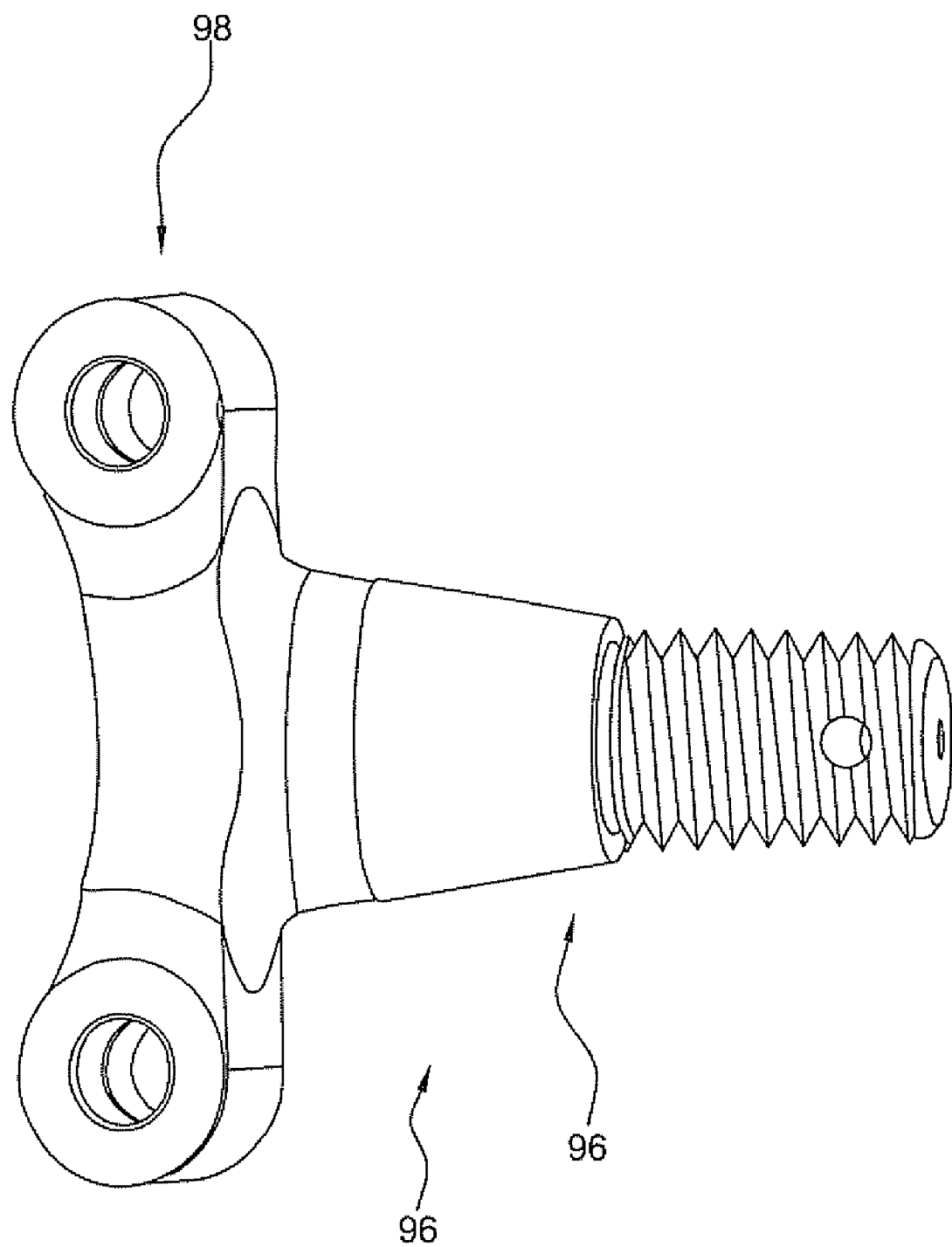
FIG. 18 illustrates a damper system damper link cantilever connector.
Figure 19:
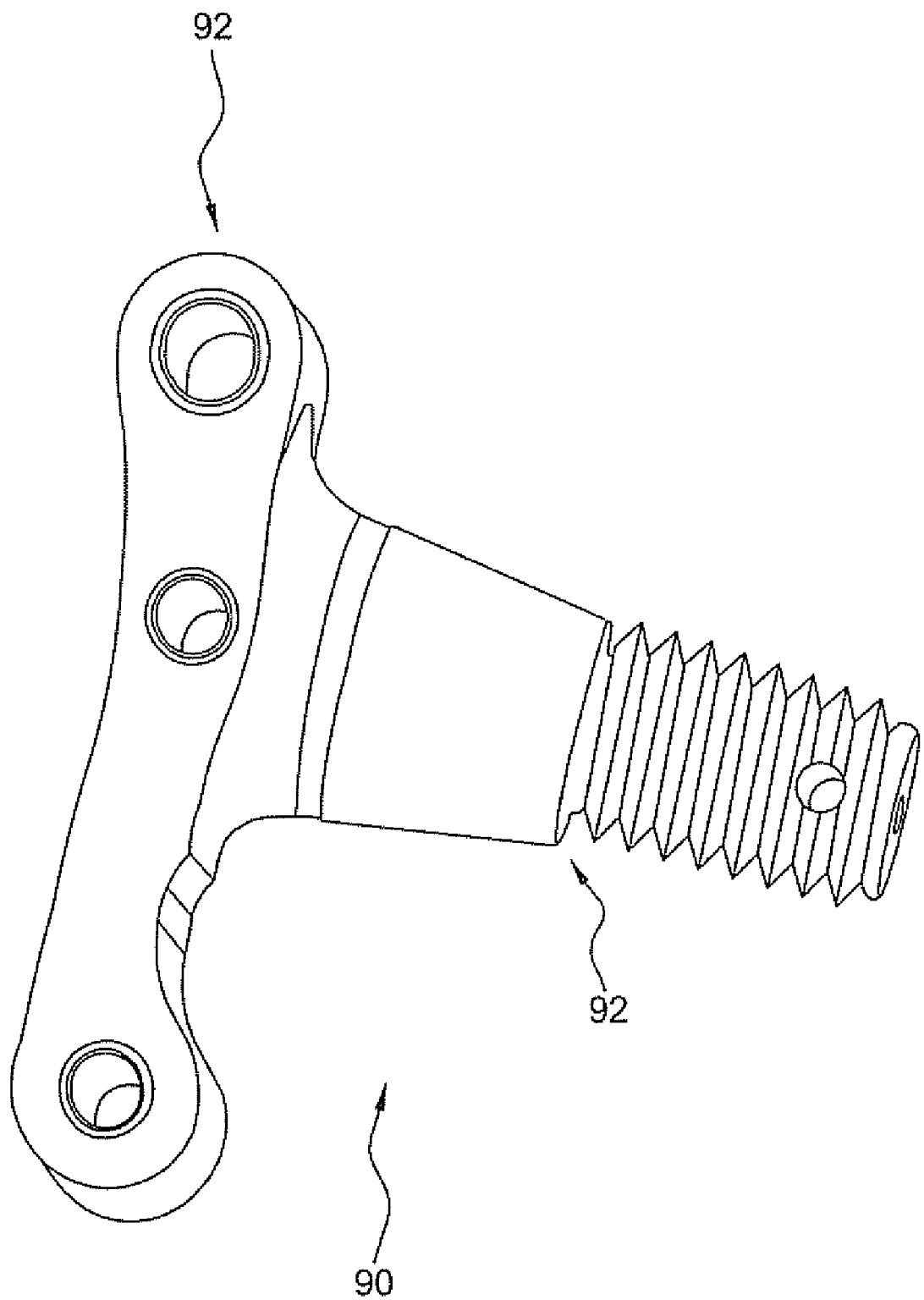
FIG. 19 illustrates a damper system damper link cantilever connector.
Figure 20:
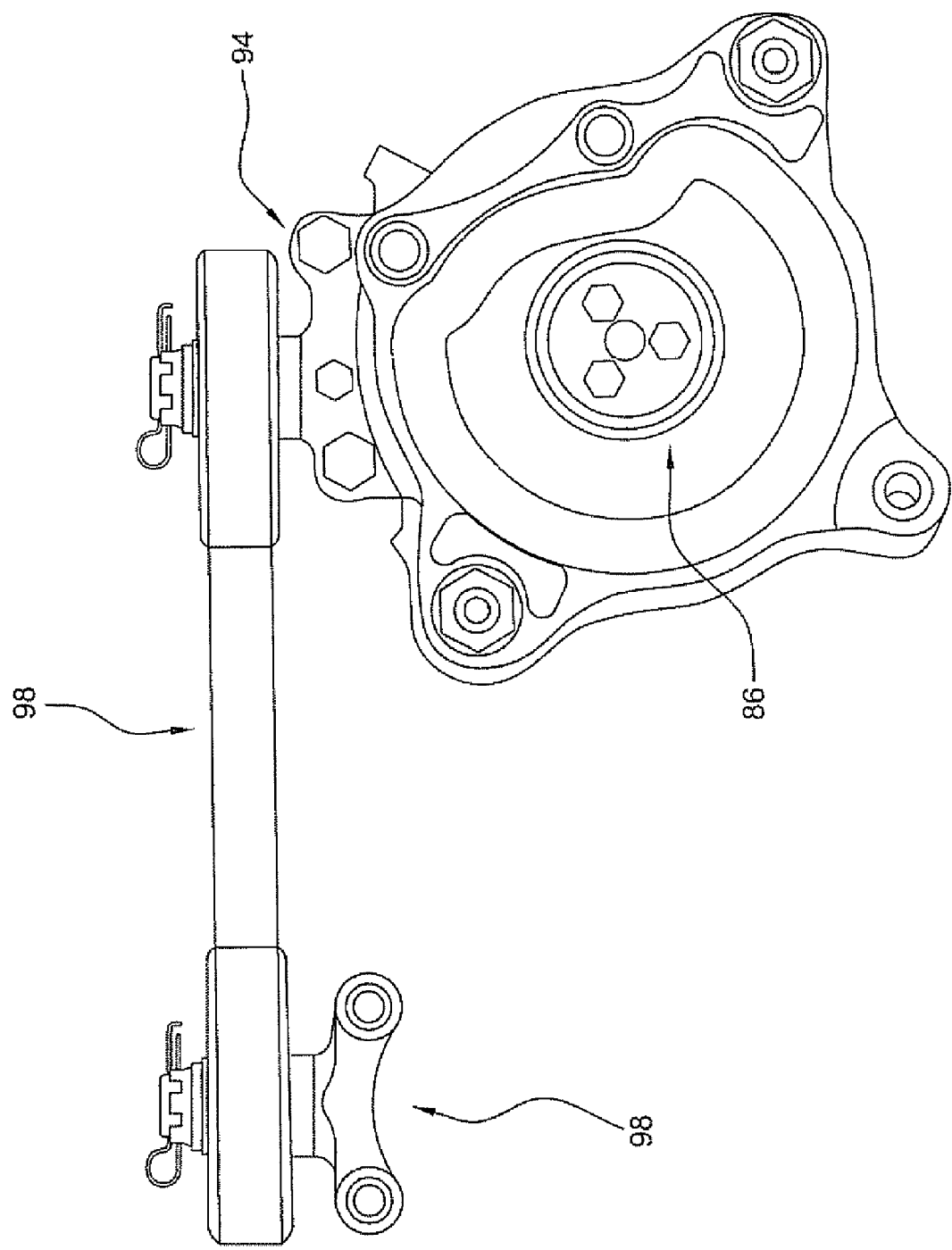
FIG. 20 illustrates a damper system with a torsional damper and a damper link.
Figure 21:
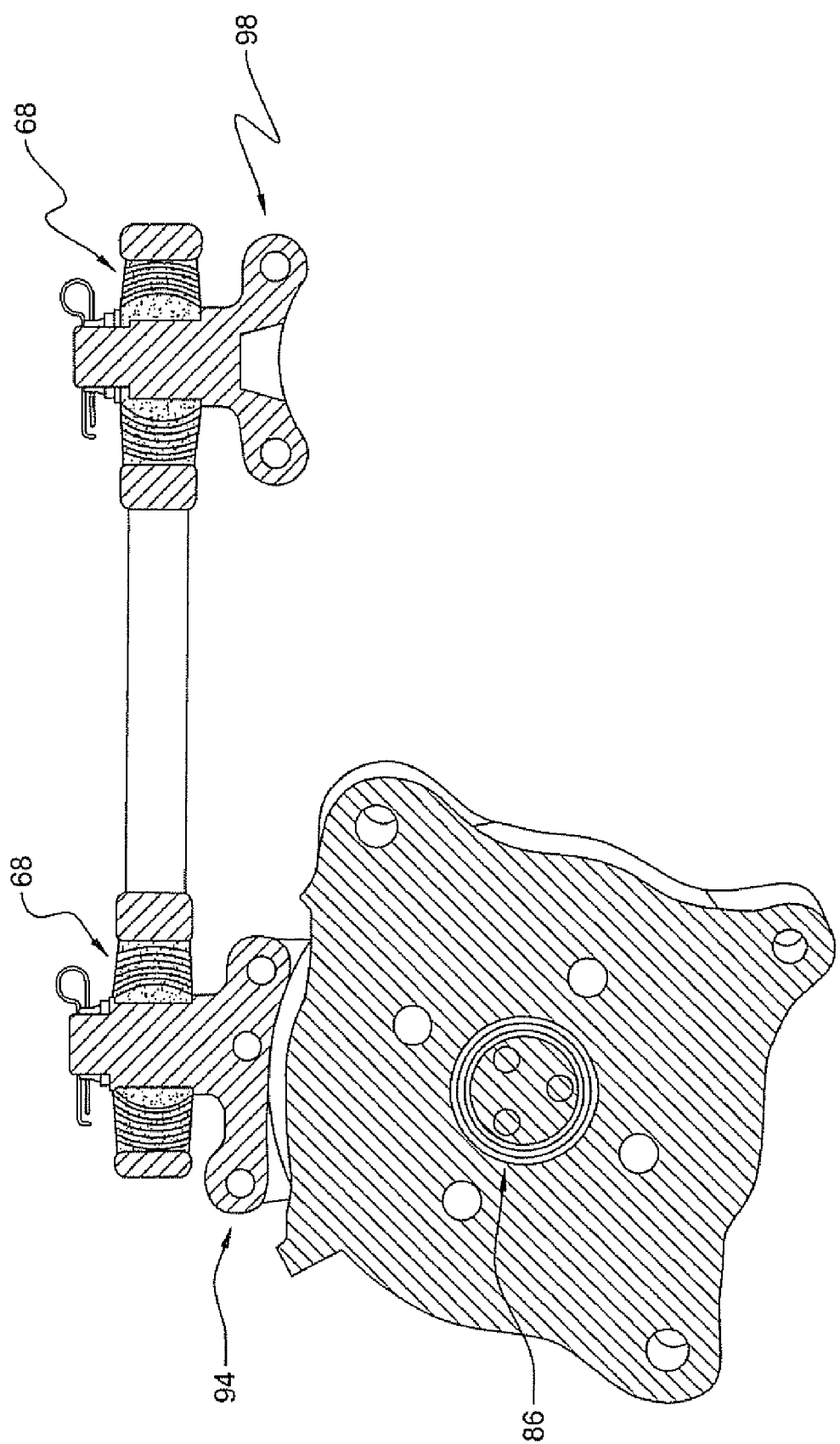
FIG. 21 illustrates a rotor damper system with a cross section of a torsional damper and a damper link.
Figure 22:
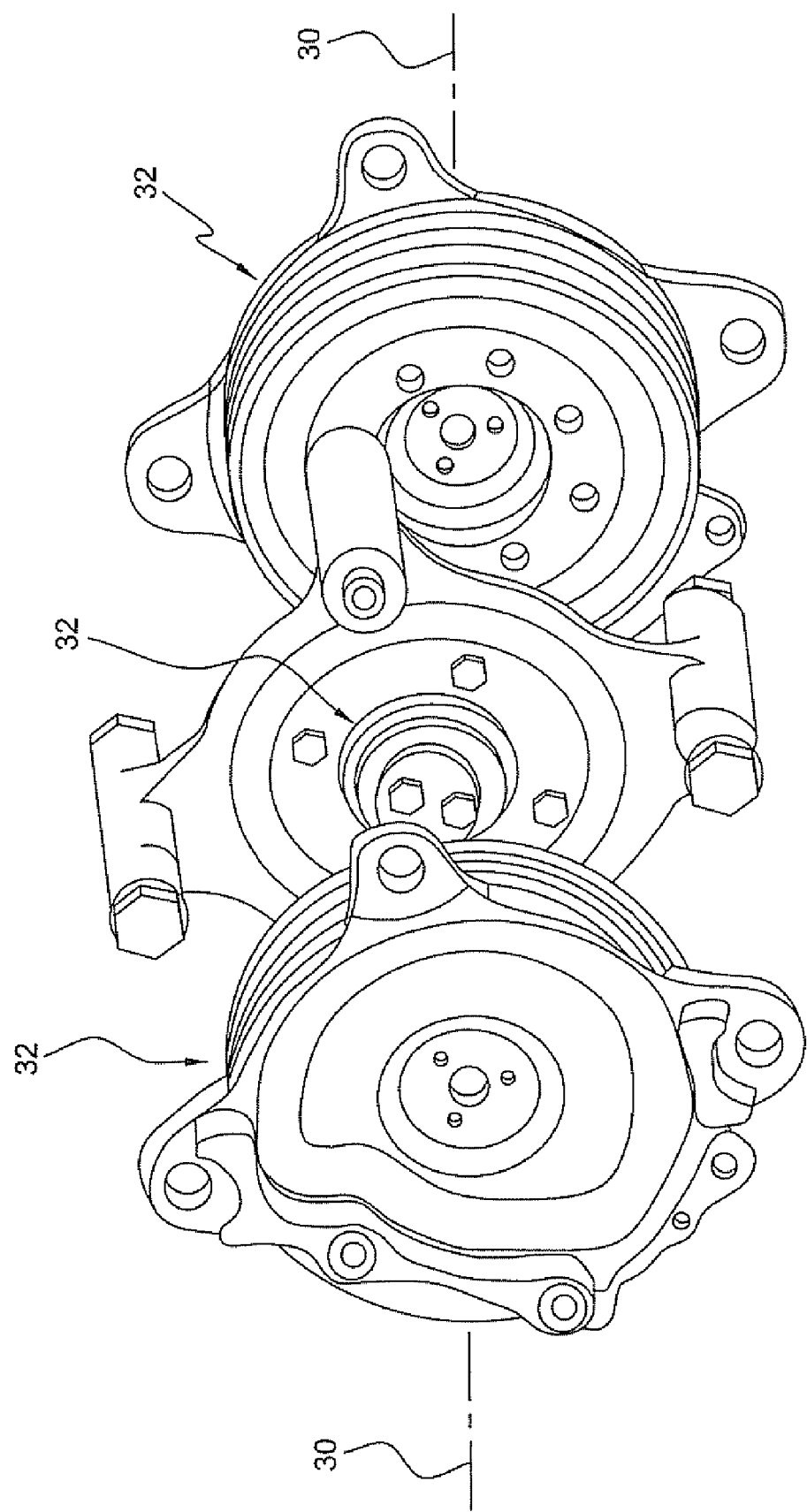
FIG. 22 illustrates an exploded view of the torsional damper of a damper system.
Figure 23:
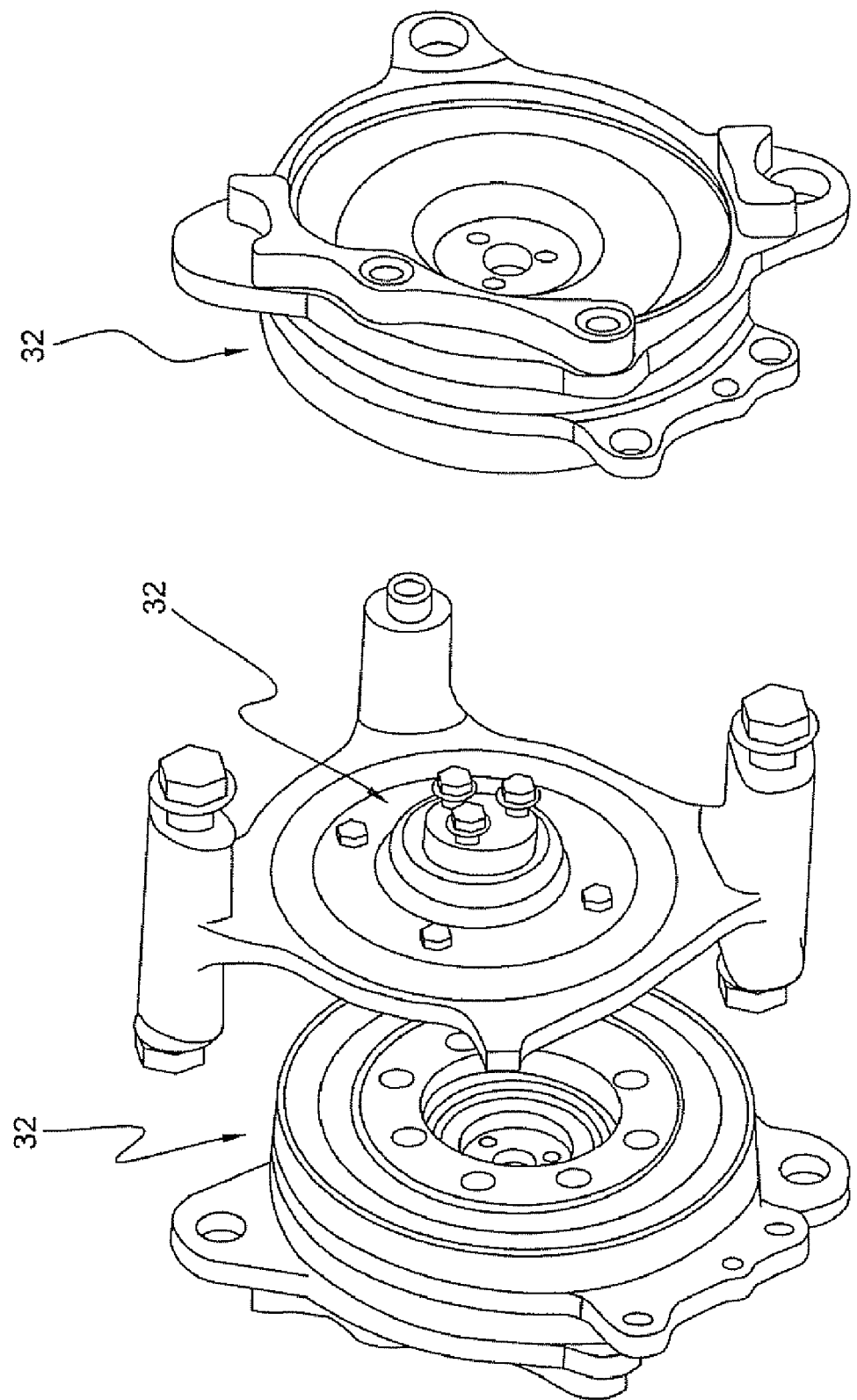
FIG. 23 illustrates an exploded view of the torsional damper of a damper system.
Figure 24:
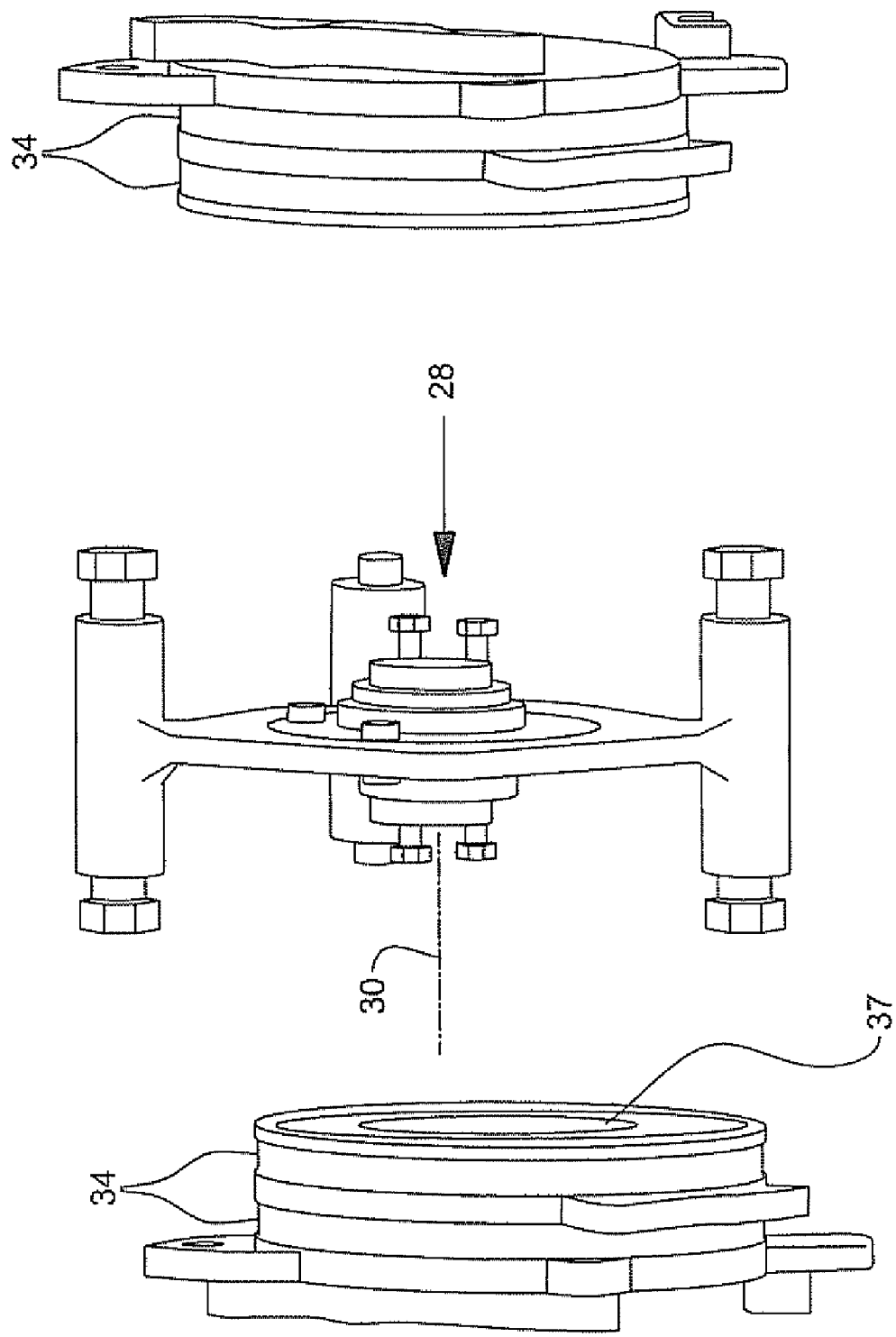
FIG. 24 illustrates an exploded view of the torsional damper of a damper system.
Figure 25:
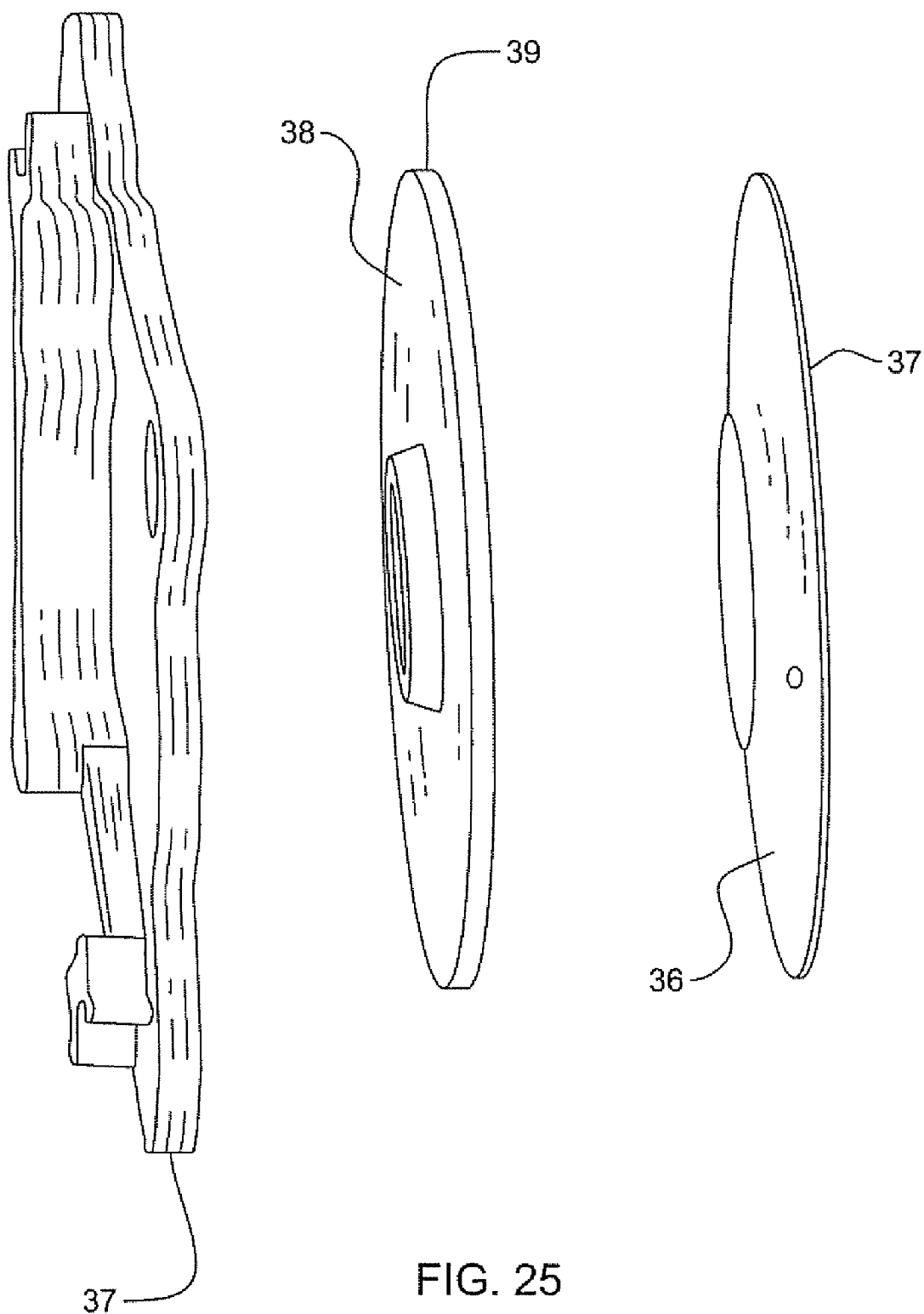
FIG. 25 illustrates an exploded view of the torsional damper of a damper system.
Figure 26:
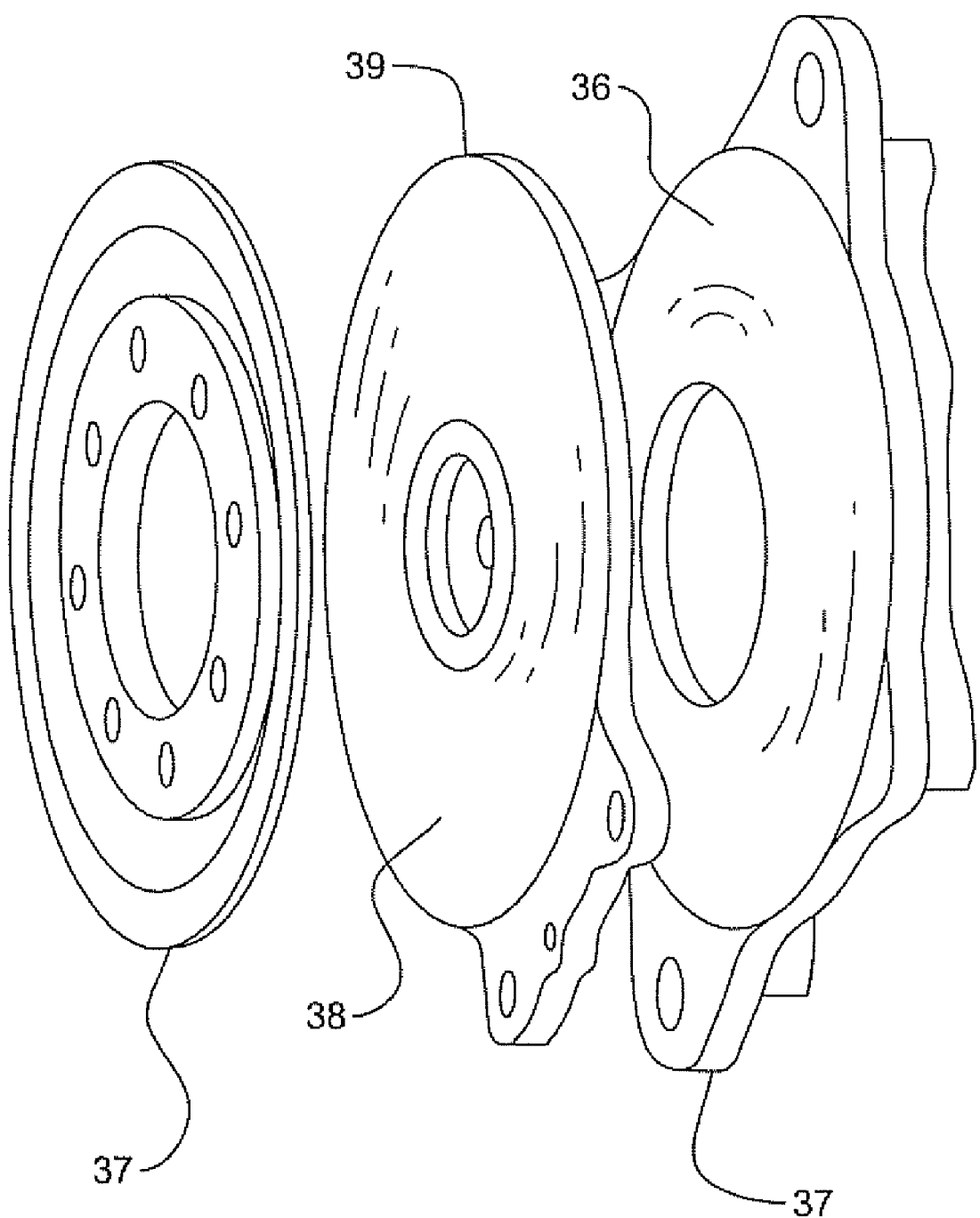
FIG. 26 illustrates an exploded view of the torsional damper of a damper system.
Figure 27:
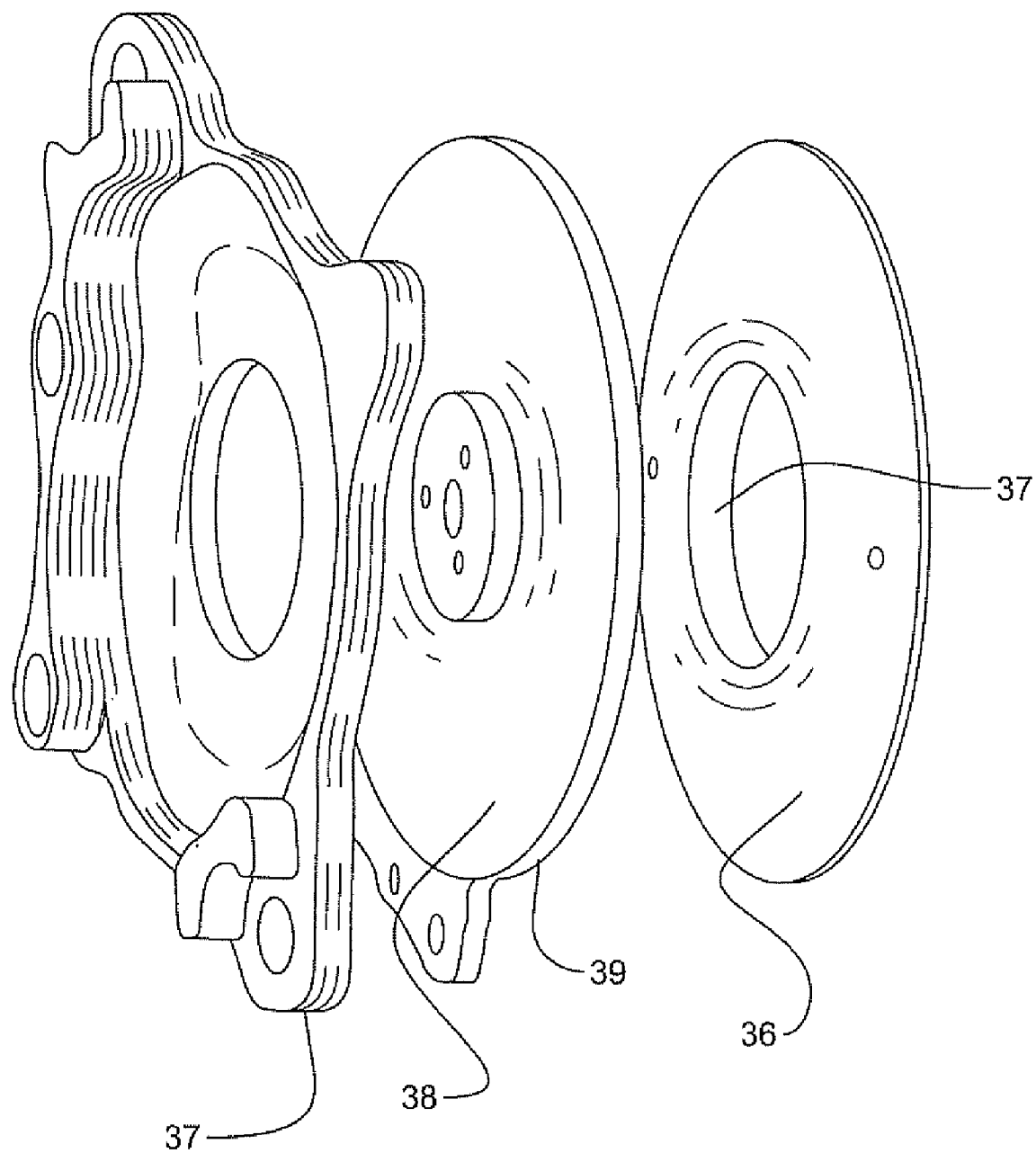
FIG. 27 illustrates an exploded view of the torsional damper of a damper system.
Figure 28:
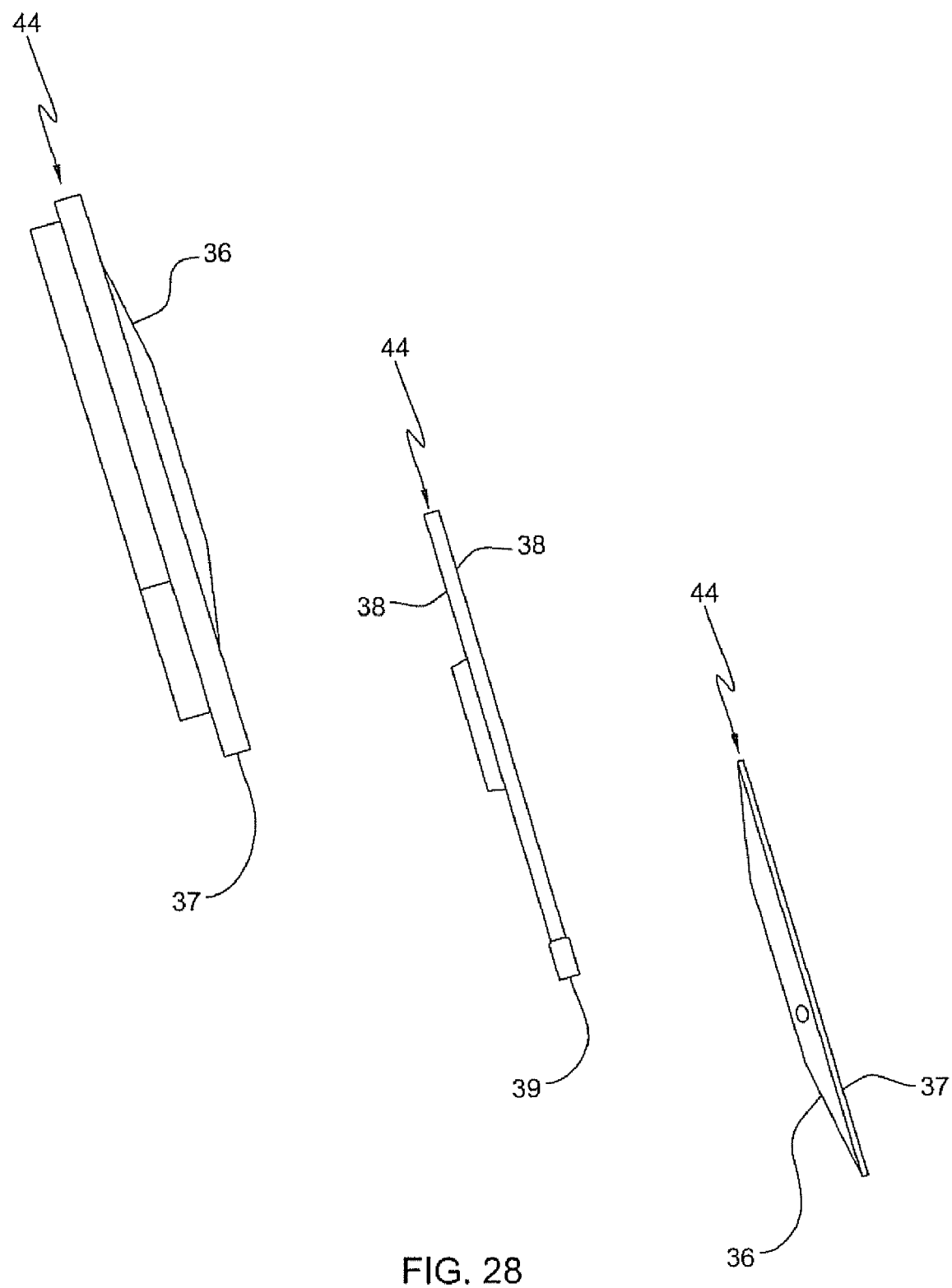
FIG. 28 illustrates an exploded view of the torsional damper of a damper system.

In an embodiment the invention includes a helicopter rotor damper system 20 for damping a lead lag motion of a helicopter blade 22 relative to a helicopter rotor 24. FIG. 1-3 show a helicopter rotor damper system 20 for damping a lead lag motion of a helicopter blade 22 relative to the helicopter rotor 24. The helicopter rotor damper system 20 includes a torsional damper 26 with a damper centering bearing 28 providing a damper center of rotation axis 30. The torsional damper 26 includes at least a first elastomeric torsional damper 32, the first elastomeric torsional damper 32 having a first elastomeric torsional damper torsional elastomer 34 bonded between a first elastomeric torsional damper first torsional damper nonelastomeric bonding surface 36 and a first elastomeric torsional damper second torsional damper nonelastomeric bonding surface 38. The torsional damper 26 includes at least a second elastomeric torsional damper 32, the second elastomeric torsional damper 32 having a second elastomeric torsional damper torsional elastomer 34 bonded between a second elastomeric torsional damper first torsional damper nonelastomeric bonding surface 36 and a second elastomeric torsional damper second torsional damper nonelastomeric bonding surface 38. FIG. 4 shows a torsional damper 26 with four torsional elastomers 34 bonded between first and second bonding surfaces 36 and 38. The damper system 20 includes a damper link 40, the damper link 40 linked at a first linkend with the torsional damper 26, wherein the torsional damper 26 and the damper link 40 are connected between the helicopter blade 22 and the helicopter rotor 24 with the first elastomeric torsional damper first torsional damper nonelastomeric bonding surface 36 rotating relative to the first elastomeric torsional damper second torsional damper nonelastomeric bonding surface 38 about the damper center of rotation axis 30, and the second elastomeric torsional damper first torsional damper nonelastomeric bonding surface 36 rotating relative to the second elastomeric torsional damper second torsional damper nonelastomeric bonding surface 38 about the damper center of rotation axis 30. Preferably the first elastomeric torsional damper torsional elastomer 34 has a twist plane 42 between the first elastomeric torsional damper first torsional damper nonelastomeric bonding surface 36 and the first elastomeric torsional damper second torsional damper nonelastomeric bonding surface 38, with the twist plane aligned substantially normal to the center of rotation axis, with the twist plane substantially in alignment with the helicopter rotor rotation plane 25. Preferably the second elastomeric torsional damper torsional elastomer 34 has a twist plane 42 between the second elastomeric torsional damper first torsional damper nonelastomeric bonding surface 36 and the second elastomeric torsional damper second torsional damper nonelastomeric bonding surface 38, with the twist plane aligned substantially normal to the center of rotation axis with the twist plane substantially in alignment with the helicopter rotor rotation plane 25. Preferably the plurality of twist planes are substantially in parallel alignment with each other and preferably centered about the center of rotation axis 30. Preferably the first elastomeric torsional damper first torsional damper nonelastomeric bonding surface 36 has a nonelastomeric support structure 37, the first elastomeric torsional damper first torsional damper nonelastomeric bonding surface nonelastomeric support structure 37 having a nonelastomeric support structure twist plane 44. The first elastomeric torsional damper second torsional damper nonelastomeric bonding surface 38 has a nonelastomeric support structure 39, the first elastomeric torsional damper second torsional damper nonelastomeric bonding surface nonelastomeric support structure 39 having a nonelastomeric support structure twist plane 44. Preferably the second elastomeric torsional damper first torsional damper nonelastomeric bonding surface 36 has a nonelastomeric support structure 37, the second elastomeric torsional damper first torsional damper nonelastomeric bonding surface nonelastomeric support structure 37 having a nonelastomeric support structure twist plane 44, and the second elastomeric torsional damper second torsional damper nonelastomeric bonding surface 38 has a nonelastomeric support structure 39, the second elastomeric torsional damper second torsional damper nonelastomeric bonding surface nonelastomeric support structure 39 having a nonelastomeric support structure twist plane 44. Preferably the elastomer twist planes 42 and the support structure twist planes 44 are aligned substantially normal to the center of rotation axis 30, and parallel with each other and in a stack, preferably with the twist planes substantially in alignment with the helicopter rotor rotation plane 25 of the rotor 24. Preferably one of the elastomeric torsional damper torsional damper nonelastomeric bonding surfaces is a conical bonding surface while its opposing bonded surface is a planar bonding surface. Preferably the conical bonding surface is supported by a support structure damper plate with conical bonding surface oriented with its first twist plane 44 and the opposing planar bonding surface supported by a support structure damper plate with the planar surface oriented with its second twist plane 44 parallel with the first twist plane.

Preferably the damper system includes a third elastomeric torsional damper, the third elastomeric torsional damper having a third elastomeric torsional damper torsional elastomer 34 bonded between a third elastomeric torsional damper first torsional damper nonelastomeric bonding surface 36 and a third elastomeric torsional damper second torsional damper nonelastomeric bonding surface 38. Preferably the damper system includes a fourth elastomeric torsional damper, the fourth elastomeric torsional damper having a fourth elastomeric torsional damper torsional elastomer 34 bonded between a fourth elastomeric torsional damper first torsional damper nonelastomeric bonding surface 36 and a fourth elastomeric torsional damper second torsional damper nonelastomeric bonding surface 38. Preferably the torsional elastomers 34 have a twist planes 42 between the first torsional damper nonelastomeric bonding surfaces 36 and the second torsional damper nonelastomeric bonding surfaces 38, with the twist planes aligned substantially normal to the center of rotation axis 30, with the twist planes 42 substantially in alignment with the helicopter rotor rotation plane 25. Preferably the torsional elastomers 34 have twist planes 42 between the first torsional damper nonelastomeric bonding surface 36 and the second torsional damper nonelastomeric bonding surface 38, with the twist plane aligned substantially normal to the center of rotation axis 30 with the twist plane substantially in alignment with the helicopter rotor rotation plane 25. Preferably the plurality of twist planes are substantially in parallel alignment with each other and preferably centered about the center of rotation axis 30. Preferably the first torsional damper nonelastomeric bonding surface 36 has a nonelastomeric support structure 37, the nonelastomeric bonding surface nonelastomeric support structure 37 having a nonelastomeric support structure twist plane 44. Preferably the second torsional damper nonelastomeric bonding surface 38 has a nonelastomeric support structure 39, the nonelastomeric support structure 39 having a nonelastomeric support structure twist plane 44.

Preferably the elastomer twist planes 42 and the support structure twist planes 44 are aligned substantially normal to the center of rotation axis 30, and parallel with each other and in a stack, preferably with the twist planes substantially in alignment with the helicopter rotor rotation plane 25 of the rotor 24. Preferably one of the elastomeric torsional damper torsional damper nonelastomeric bonding surfaces is a conical bonding surface while its opposing bonded surface is a planar bonding surface. Preferably the conical bonding surface is supported by a support structure damper plate with conical bonding surface oriented with its first twist plane 44 and the opposing planar bonding surface supported by a support structure damper plate with the planar surface oriented with its second twist plane 44 parallel with the first twist plane.

Preferably the damper link 40 is a longitudinally extending link, the longitudinally extending link having a longitudinal link axis 46 with the link having a first linkend 48 and a distal second linkend 50. Preferably the longitudinally extending damper link 40 provides a linear motion input with the damper link 40 linearly reciprocates along it longitudinal length 46. Preferably the first linkend 48 is comprised of a nonelastomeric outer link housing member 52, with the linkend having a linkend cavity 54 with a linkend cavity inner circumferential bonding surface 56. Preferably a linkend nonelastomeric inner member 58 is contained in the linkend cavity 54, the linkend nonelastomeric inner member 58 having a linkend outer circumferential bonding surface 60, with a linkend elastomeric intermediate 62 having an outer circumferential elastomeric bonding surface 64 and an inner circumferential elastomeric bonding surface 66, the outer circumferential elastomeric bonding surface 64 bonded to the linkend cavity inner circumferential bonding surface 56 and the inner circumferential elastomeric bonding surface 66 bonded to the linkend outer circumferential bonding surface 60. Preferably the elastomeric intermediate 62 contains a plurality of bonded nonelastomeric shims 68. Preferably the second linkend 50 is comprised of a nonelastomeric outer link housing member 52, with the linkend having a linkend cavity 54 with a linkend cavity inner circumferential bonding surface 56, and a linkend nonelastomeric inner member 58 contained in the linkend cavity 54. The linkend nonelastomeric inner member 58 has a linkend outer circumferential bonding surface 60. The linkend cavity contains a linkend elastomeric intermediate 62 having an outer circumferential elastomeric bonding surface 64 and an inner circumferential elastomeric bonding surface 66, the outer circumferential elastomeric bonding surface bonded to the linkend cavity inner circumferential bonding surface and the inner circumferential elastomeric bonding surface bonded to the linkend outer circumferential bonding surface, with the elastomeric intermediate containing a plurality of bonded nonelastomeric shims 68.

Preferably the damper centering bearing 28 is comprised of a nonelastomeric outer centering bearing housing member 70, having a centering bearing housing cavity 72 with a cavity inner circumferential bonding surface 74, and a centering bearing nonelastomeric inner member 76 contained in the centering bearing housing cavity 72, the centering bearing nonelastomeric inner member 76 having an outer circumferential bonding surface 78, and a centering bearing elastomeric intermediate 80 having an outer circumferential elastomeric bonding surface 82 and an inner circumferential elastomeric bonding surface 84, the outer circumferential elastomeric bonding surface 82 bonded to the cavity inner circumferential bonding surface 74 and the inner circumferential elastomeric bonding surface 84 bonded to the outer circumferential bonding surface 78. Preferably centering bearing elastomeric intermediate 80 is a tubular elastomer bonded between the bearing inner and outer members. Preferably the damper centering bearing elastomeric intermediate 80 contains at least a bonded first nonelastomeric shim 86, preferably a plurality of shims, preferably a plurality of cylindrical tubular segments. Preferably the damper torsional elastomers 34 are comprised of a first elastomer, preferably a highly damped elastomer, and the damper centering bearing elastomeric intermediate 80 is comprised of a second different elastomer.

Preferably the first elastomeric torsional damper first torsional damper nonelastomeric bonding surface rotates relative to the first elastomeric torsional damper second torsional damper nonelastomeric bonding surface about the damper center of rotation axis in a damper angular rotation range, preferably in the range from a negative thirty degrees through a positive thirty degrees, and the second elastomeric torsional damper first torsional damper nonelastomeric bonding surface rotates relative to the second elastomeric torsional damper second torsional damper nonelastomeric bonding surface about the damper center of rotation axis with the damper rotation in the range from the negative thirty degrees through the positive thirty degrees. Preferably the first elastomeric torsional damper first torsional damper nonelastomeric bonding surface rotates relative to the first elastomeric torsional damper second torsional damper nonelastomeric bonding surface about the damper center of rotation axis in a damper rotation in the range from a negative thirty degrees through a positive thirty degrees, and the second elastomeric torsional damper first torsional damper nonelastomeric bonding surface rotates relative to the second elastomeric torsional damper second torsional damper nonelastomeric bonding surface about the damper center of rotation axis with the damper rotation in the range from the negative thirty degrees through the positive thirty degrees.

Preferably the damper system includes a first cantilever connector 90 and a second cantilever connector 90. Preferably the linear reciprocating motion of the damper link 40 connected through the cantilever connector 90 rotates the first and second elastomer bonded surfaces of the torsional elastomers. Preferably the first cantilever connector 90 provides a cantilevered connection between the torsional damper 26 and the damper link 40. Preferably the cantilever connector 90 is comprised of a T connector with a first T member 92 received in the drivelink end and the second normal T member 94 grounded to the torsional damper 26. Preferably the second cantilever connector 90 provides a cantilevered connection between the damper link 40 and the helicopter rotor 24. Preferably the cantilever connector 90 is comprised of a T connector with a first T member 96 received in the drivelink end and the second normal T member 98 grounded to the helicopter rotor 24.

In an embodiment the invention includes a damper with a damper centering bearing providing a damper center of rotation axis. The damper includes at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The damper including at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis. Preferably the damper includes the helicopter rotor damper 26 with the damper centering bearing 28 providing the damper center of rotation axis 30. Preferably the damper 26 damps the lead lag motion of the helicopter blade 22 relative to the rotor 24. Preferably the damper 26 includes at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, wherein the first elastomeric torsional damper first torsional damper nonelastomeric bonding surface rotate relative to the first elastomeric torsional damper second torsional damper nonelastomeric bonding surface about the damper center of rotation axis, and the second elastomeric torsional damper first torsional damper nonelastomeric bonding surface rotate relative to the second elastomeric torsional damper second torsional damper nonelastomeric bonding surface about the damper center of rotation axis. Preferably the first elastomeric torsional damper torsional elastomer has a twist plane between the first elastomeric torsional damper first torsional damper nonelastomeric bonding surface and the first elastomeric torsional damper second torsional damper nonelastomeric bonding surface. Preferably the twist plane is aligned substantially normal to the center of rotation axis, with the twist plane substantially in alignment with the helicopter rotor rotation plane. Preferably the second elastomeric torsional damper torsional elastomer has a twist plane between the second elastomeric torsional damper first torsional damper nonelastomeric bonding surface and the second elastomeric torsional damper second torsional damper nonelastomeric bonding surface. Preferably the twist plane is aligned substantially normal to the center of rotation axis, preferably with the twist plane substantially in alignment with the helicopter rotor rotation plane. Preferably the twist planes are substantially in parallel alignment with each other and preferably centered about the center of rotation axis. Preferably the first elastomeric torsional damper first torsional damper nonelastomeric bonding surface has a nonelastomeric support structure with the first elastomeric torsional damper first torsional damper nonelastomeric bonding surface nonelastomeric support structure having a nonelastomeric support structure twist plane. Preferably the first elastomeric torsional damper second torsional damper nonelastomeric bonding surface has a nonelastomeric support structure with the first elastomeric torsional damper second torsional damper nonelastomeric bonding surface nonelastomeric support structure having a nonelastomeric support structure twist plane. Preferably the second elastomeric torsional damper first torsional damper nonelastomeric bonding surface has a nonelastomeric support structure with the second elastomeric torsional damper first torsional damper nonelastomeric bonding surface nonelastomeric support structure having a nonelastomeric support structure twist plane. Preferably the second elastomeric torsional damper second torsional damper nonelastomeric bonding surface has a nonelastomeric support structure with the second elastomeric torsional damper second torsional damper nonelastomeric bonding surface nonelastomeric support structure having a nonelastomeric support structure twist plane. Preferably the twist planes are aligned substantially normal to the center of rotation axis, and parallel with each other and in a stack. Preferably the twist planes are substantially in alignment with the helicopter rotor rotation plane. Preferably the support structure damper plates with the conical bonding surfaces are oriented with their twist planes parallel with the opposing elastomer planar bonding surfaces and their support structure twist planes. Preferably the damper includes the third elastomeric torsional damper, the third elastomeric torsional damper having a third elastomeric torsional damper torsional elastomer bonded between a third elastomeric torsional damper first torsional damper nonelastomeric bonding surface and a third elastomeric torsional damper second torsional damper nonelastomeric bonding surface, and the fourth elastomeric torsional damper, the fourth elastomeric torsional damper having a fourth elastomeric torsional damper torsional elastomer bonded between a fourth elastomeric torsional damper first torsional damper nonelastomeric bonding surface and a fourth elastomeric torsional damper second torsional damper nonelastomeric bonding surface. Preferably the damper includes a damper link interface, the damper link interface grounding the damper link 40 to at least one of the nonelastomeric bonding surfaces (preferably one bonding surface of each of the elastomers). Preferably the damper centering bearing is comprised of the nonelastomeric outer centering bearing housing member, having a centering bearing housing cavity with a cavity inner circumferential bonding surface, and a centering bearing nonelastomeric inner member contained in the centering bearing housing cavity, the centering bearing nonelastomeric inner member having an outer circumferential bonding surface, and a centering bearing elastomeric intermediate having an outer circumferential elastomeric bonding surface and an inner circumferential elastomeric bonding surface, the outer circumferential elastomeric bonding surface bonded to the cavity inner circumferential bonding surface and the inner circumferential elastomeric bonding surface bonded to the outer circumferential bonding surface. Preferably the centering bearing is comprised of a tubular elastomer bonded between the inner and outer members. Preferably the damper centering bearing elastomeric intermediate contains at least a bonded first nonelastomeric shim. Preferably the first elastomeric torsional damper torsional elastomer and the second elastomeric torsional damper torsional elastomer are comprised of a first elastomer (highly damped elastomer) and the damper centering bearing elastomeric intermediate is comprised of a second different elastomer. Preferably the first elastomeric torsional damper first torsional damper nonelastomeric bonding surface rotate relative to the first elastomeric torsional damper second torsional damper nonelastomeric bonding surface about the damper center of rotation axis in a damper rotation in the range from a negative thirty degrees through a positive thirty degrees, and the second elastomeric torsional damper first torsional damper nonelastomeric bonding surface rotate relative to the second elastomeric torsional damper second torsional damper nonelastomeric bonding surface about the damper center of rotation axis with the damper rotation in the range from the negative thirty degrees through the positive thirty degrees. Preferably the first elastomeric torsional damper first torsional damper nonelastomeric bonding surface rotate relative to the first elastomeric torsional damper second torsional damper nonelastomeric bonding surface about the damper center of rotation axis in a damper rotation in the range from a negative thirty degrees through a positive thirty degrees, and the second elastomeric torsional damper first torsional damper nonelastomeric bonding surface rotate relative to the second elastomeric torsional damper second torsional damper nonelastomeric bonding surface about the damper center of rotation axis with the damper rotation in the range from the negative thirty degrees through the positive thirty degrees.

In an embodiment the invention includes an aircraft link system. The aircraft link system includes a longitudinally extending link, the longitudinally extending link having a longitudinal link axis with the link having a first linkend and a distal second linkend. The first linkend is comprised of a nonelastomeric outer link housing member, the first linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims. A first cantilever connector provides a cantileved connection between the first linkend nonelastomeric inner member and a first aircraft member. Preferably the aircraft link system includes the aircraft link 40 with the at least first cantilever connector 90. Preferably the aircraft link system includes longitudinally extending link 40 with longitudinal link axis 46 with the link having first linkend 48 and distal second linkend 50. The first linkend is comprised of a nonelastomeric outer link housing member, the first linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims, and a first cantilever connector providing a cantileved connection between the first linkend nonelastomeric inner member and a first aircraft member. Preferably the second linkend is comprised of the nonelastomeric outer link housing member, the second linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims, and a second cantilever connector providing a cantileved connection between the second linkend nonelastomeric inner member and a second aircraft member. Preferably the first aircraft member is the damper. Preferably the second aircraft member is the rotor.

In an embodiment the invention includes a method of making a damper system. The method includes providing a damper centering bearing providing a damper center of rotation axis. The method includes providing at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface. The method includes providing at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The method includes centering the at least first elastomeric torsional damper and the at least second elastomeric torsional damper to rotate about the damper center of rotation axis. The method includes providing a damper link. The method includes connecting the damper link with the at least first elastomeric torsional damper and the at least second elastomeric torsional damper wherein the first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis. Preferably the method includes making the damper system 20, preferably for damping the lead lag motion of the helicopter blade 22 relative to the helicopter rotor 24. Preferably the method includes providing the damper centering bearing providing a damper center of rotation axis, providing at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, providing at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface. The method includes centering the at least first elastomeric torsional damper and the at least second elastomeric torsional damper to rotate about the damper center of rotation axis. The method includes providing a damper link, and connecting the damper link with the at least first elastomeric torsional damper and the at least second elastomeric torsional damper. Preferably the torsional damper and the damper link are connected between the helicopter blade and the helicopter rotor with the first elastomeric torsional damper first torsional damper nonelastomeric bonding surface rotating relative to the first elastomeric torsional damper second torsional damper nonelastomeric bonding surface about the damper center of rotation axis. Preferably the second elastomeric torsional damper first torsional damper nonelastomeric bonding surface rotating relative to the second elastomeric torsional damper second torsional damper nonelastomeric bonding surface about the damper center of rotation axis. Preferably the first elastomeric torsional damper torsional elastomer has a twist plane between the first elastomeric torsional damper first torsional damper nonelastomeric bonding surface and the first elastomeric torsional damper second torsional damper nonelastomeric bonding surface, with twist plane aligned substantially normal to the center of rotation axis, with the twist plane substantially in alignment with the helicopter rotor rotation plane. Preferably the second elastomeric torsional damper torsional elastomer has a twist plane between the second elastomeric torsional damper first torsional damper nonelastomeric bonding surface and the second elastomeric torsional damper second torsional damper nonelastomeric bonding surface, with the twist plane aligned substantially normal to the center of rotation axis, with the twist plane substantially in alignment with the helicopter rotor rotation plane. Preferably the twist planes are substantially in parallel alignment with each other and preferably centered about the center of rotation axis. Preferably the twist planes are substantially in parallel alignment with each other and preferably in alignment with longitudinal axis of damper link. Preferably the first elastomeric torsional damper first torsional damper nonelastomeric bonding surface has a nonelastomeric support structure, with the first elastomeric torsional damper first torsional damper nonelastomeric bonding surface nonelastomeric support structure having a nonelastomeric support structure twist plane. Preferably the first elastomeric torsional damper second torsional damper nonelastomeric bonding surface has a nonelastomeric support structure, with the first elastomeric torsional damper second torsional damper nonelastomeric bonding surface nonelastomeric support structure having a nonelastomeric support structure twist plane. Preferably the second elastomeric torsional damper first torsional damper nonelastomeric bonding surface has a nonelastomeric support structure, with the second elastomeric torsional damper first torsional damper nonelastomeric bonding surface nonelastomeric support structure having a nonelastomeric support structure twist plane.

Preferably the second elastomeric torsional damper second torsional damper nonelastomeric bonding surface has a nonelastomeric support structure, with the second elastomeric torsional damper second torsional damper nonelastomeric bonding surface nonelastomeric support structure having a nonelastomeric support structure twist plane. Preferably the twist planes are aligned substantially normal to the center of rotation axis, and parallel with each other and in a stack. Preferably the twist planes are substantially in alignment with the helicopter rotor rotation plane. Preferably the method includes providing the third elastomeric torsional damper, the third elastomeric torsional damper having a third elastomeric torsional damper torsional elastomer bonded between a third elastomeric torsional damper first torsional damper nonelastomeric bonding surface and a third elastomeric torsional damper second torsional damper nonelastomeric bonding surface, and providing the fourth elastomeric torsional damper, the fourth elastomeric torsional damper having a fourth elastomeric torsional damper torsional elastomer bonded between a fourth elastomeric torsional damper first torsional damper nonelastomeric bonding surface and a fourth elastomeric torsional damper second torsional damper nonelastomeric bonding surface. Preferably the damper link is the longitudinally extending link, the longitudinally extending link having the longitudinal link axis with the damper link having the first linkend and the distal second link end. Preferably the damper link provides a linear motion input with the damper link linearly reciprocating along it longitudinal length, preferably with longitudinal length and axis aligned with twist planes 42 and 44 of the damper. Preferably the first linkend is comprised of the nonelastomeric outer link housing member, the linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims. Preferably the second linkend is comprised of the nonelastomeric outer link housing member, the linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims. Preferably the damper centering bearing is comprised of a nonelastomeric outer centering bearing housing member, having a centering bearing housing cavity with a cavity inner circumferential bonding surface, and a centering bearing nonelastomeric inner member contained in the centering bearing housing cavity, the centering bearing nonelastomeric inner member having an outer circumferential bonding surface, and a centering bearing elastomeric intermediate having an outer circumferential elastomeric bonding surface and an inner circumferential elastomeric bonding surface, the outer circumferential elastomeric bonding surface bonded to the cavity inner circumferential bonding surface and the inner circumferential elastomeric bonding surface bonded to the outer circumferential bonding surface. Preferably the centering bearing is the tubular elastomer bonded between the inner and outer members. Preferably the damper centering bearing elastomeric intermediate contains at least a bonded first nonelastomeric shim. Preferably the first elastomeric torsional damper torsional elastomer and the second elastomeric torsional damper torsional elastomer are comprised of the first highly damped elastomer and the damper centering bearing elastomeric intermediate is comprised of the second different elastomer. Preferably the first elastomeric torsional damper first torsional damper nonelastomeric bonding surface rotate relative to the first elastomeric torsional damper second torsional damper nonelastomeric bonding surface about the damper center of rotation axis in a damper rotation in the range from a negative thirty degrees through a positive thirty degrees, and the second elastomeric torsional damper first torsional damper nonelastomeric bonding surface rotate relative to the second elastomeric torsional damper second torsional damper nonelastomeric bonding surface about the damper center of rotation axis with the damper rotation in the range from the negative thirty degrees through the positive thirty degrees. Preferably the method includes providing the first cantilever connector for connecting the damper link with the at least first elastomeric torsional damper and the at least second elastomeric torsional damper. Preferably the first cantilever connector provides a cantileved connection between the torsional damper and the damper link, preferably with the first T member received in the drivelink end and the second normal T member grounded to the torsional damper. Preferably the method includes providing the second cantilever connector for providing a cantileved connection between the damper link and the helicopter rotor, preferably with the first T member received in the drivelink end and the second normal T member grounded to the helicopter rotor.

In an embodiment the invention includes a method of controlling a vehicle motion. The method includes providing a damper, the damper including a damper centering bearing providing a damper center of rotation axis, at least a first elastomeric torsional damper, the first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, and at least a second elastomeric torsional damper, the second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, the at least first elastomeric torsional damper and the at least second elastomeric torsional damper rotating about the damper center of rotation axis. The method includes providing a damper link. The method includes connecting the damper link with the damper wherein the first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis. Preferably the method of controlling vehicle motion includes providing damper 26. Preferably the damper includes the damper centering bearing 28 providing the damper center of rotation axis 30. The damper includes the at least first elastomeric torsional damper, the first elastomeric torsional damper having the first elastomeric torsional damper torsional elastomer bonded between the first elastomeric torsional damper first torsional damper nonelastomeric bonding surface and the first elastomeric torsional damper second torsional damper nonelastomeric bonding surface, and the at least second elastomeric torsional damper. The second elastomeric torsional damper has the second elastomeric torsional damper torsional elastomer bonded between the second elastomeric torsional damper first torsional damper nonelastomeric bonding surface and the second elastomeric torsional damper second torsional damper nonelastomeric bonding surface, the at least first elastomeric torsional damper and the at least second elastomeric torsional damper rotating about the damper center of rotation axis. The method includes providing a damper link 40. The method includes connecting the damper link 40 with the damper wherein the first elastomeric torsional damper first torsional damper nonelastomeric bonding surface rotates relative to the first elastomeric torsional damper second torsional damper nonelastomeric bonding surface about the damper center of rotation axis, and the second elastomeric torsional damper first torsional damper nonelastomeric bonding surface rotates relative to the second elastomeric torsional damper second torsional damper nonelastomeric bonding surface about the damper center of rotation axis. Preferably the first elastomeric torsional damper torsional elastomer has a twist plane between the first elastomeric torsional damper first torsional damper nonelastomeric bonding surface and the first elastomeric torsional damper second torsional damper nonelastomeric bonding surface, with the twist plane aligned substantially normal to the center of rotation axis, preferably with the twist plane substantially in alignment with the helicopter rotor rotation plane. Preferably the second elastomeric torsional damper torsional elastomer has a twist plane between the second elastomeric torsional damper first torsional damper nonelastomeric bonding surface and the second elastomeric torsional damper second torsional damper nonelastomeric bonding surface, with the twist plane aligned substantially normal to the center of rotation axis, preferably with the twist plane substantially in alignment with the helicopter rotor rotation plane. Preferably the twist planes are substantially in parallel alignment with each other and preferably centered about the center of rotation axis. Preferably the twist planes are substantially in parallel alignment with each other and preferably in alignment with longitudinal axis of damper link.

Preferably the first elastomeric torsional damper first torsional damper nonelastomeric bonding surface has a nonelastomeric support structure with the first elastomeric torsional damper first torsional damper nonelastomeric bonding surface nonelastomeric support structure having a nonelastomeric support structure twist plane. Preferably the first elastomeric torsional damper second torsional damper nonelastomeric bonding surface has a nonelastomeric support structure with the first elastomeric torsional damper second torsional damper nonelastomeric bonding surface nonelastomeric support structure having a nonelastomeric support structure twist plane. Preferably the second elastomeric torsional damper first torsional damper nonelastomeric bonding surface has a nonelastomeric support structure with the second elastomeric torsional damper first torsional damper nonelastomeric bonding surface nonelastomeric support structure having a nonelastomeric support structure twist plane. Preferably the second elastomeric torsional damper second torsional damper nonelastomeric bonding surface has a nonelastomeric support structure with the second elastomeric torsional damper second torsional damper nonelastomeric bonding surface nonelastomeric support structure having a nonelastomeric support structure twist plane. Preferably the twist planes are aligned substantially normal to the center of rotation axis, with the twist planes parallel with each other and in a stack. Preferably the twist planes are substantially in alignment with the helicopter rotor rotation plane. Preferably the method includes providing the third elastomeric torsional damper, the third elastomeric torsional damper having the third elastomeric torsional damper torsional elastomer bonded between a third elastomeric torsional damper first torsional damper nonelastomeric bonding surface and a third elastomeric torsional damper second torsional damper nonelastomeric bonding surface. Preferably the method includes providing the fourth elastomeric torsional damper, the fourth elastomeric torsional damper having the fourth elastomeric torsional damper torsional elastomer bonded between a fourth elastomeric torsional damper first torsional damper nonelastomeric bonding surface and a fourth elastomeric torsional damper second torsional damper nonelastomeric bonding surface.

Preferably the damper link is the longitudinally extending link with the longitudinal link axis with the damper link having the first linkend and the distal second link end. Preferably the damper link provides a linear motion input with the damper link linearly reciprocating along its longitudinal length, preferably with longitudinal length and axis 46 aligned with twist planes 42 and 44. Preferably the linkends are comprised of the nonelastomeric outer link housing members, with the linkend having the linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of bonded nonelastomeric shims.

Preferably the damper centering bearing is comprised of the nonelastomeric outer centering bearing housing member, having a centering bearing housing cavity with a cavity inner circumferential bonding surface, and a centering bearing nonelastomeric inner member contained in the centering bearing housing cavity, the centering bearing nonelastomeric inner member having an outer circumferential bonding surface, and a centering bearing elastomeric intermediate having an outer circumferential elastomeric bonding surface and an inner circumferential elastomeric bonding surface, the outer circumferential elastomeric bonding surface bonded to the cavity inner circumferential bonding surface and the inner circumferential elastomeric bonding surface bonded to the outer circumferential bonding surface. Preferably the damper centering bearing elastomeric intermediate contains at least a first nonelastomeric cylindrical shim. Preferably the torsional elastomers are comprised of a first highly damped elastomer and the damper centering bearing elastomeric intermediate is comprised of a second different elastomer. Preferably the first elastomeric torsional damper first torsional damper nonelastomeric bonding surface rotates relative to the first elastomeric torsional damper second torsional damper nonelastomeric bonding surface about the damper center of rotation axis in a damper rotation in the range from a negative twenty five degrees through a positive twenty five degrees, and the second elastomeric torsional damper first torsional damper nonelastomeric bonding surface rotates relative to the second elastomeric torsional damper second torsional damper nonelastomeric bonding surface about the damper center of rotation axis with the damper rotation in the range from the negative twenty five degrees through the positive twenty five degrees.

Preferably the method includes providing a first cantilever connector for connecting the damper link with the at least first elastomeric torsional damper and the at least second elastomeric torsional damper. Preferably the first cantilever connector provides a cantilevered connection between the torsional damper and the damper link, preferably with a T connector first T member received in the linkend and the second normal T member grounded to the torsional damper. Preferably the method includes providing a second cantilever connector for providing a cantilevered connection between the damper link and the vehicle rotor, preferably with a T connector first T member received in the linkend and the second normal T member grounded to the helicopter rotor.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A helicopter rotor damper system for damping a motion of a helicopter blade relative to a helicopter rotor, said helicopter rotor damper system including: a torsional damper with a damper centering bearing providing a damper center of rotation axis, at least a first elastomeric torsional damper, said first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, at least a second elastomeric torsional damper, said second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, and a damper link interface, said damper link linked with said elastomeric torsional damper, wherein said elastomeric torsional damper and said damper link are connected between said helicopter blade and said helicopter rotor with said first elastomeric torsional damper first torsional damper nonelastomeric bonding surface rotating relative to said first elastomeric torsional damper second torsional damper nonelastomeric bonding surface, and said second elastomeric torsional damper first torsional damper nonelastomeric bonding surface rotating relative to said second elastomeric torsional damper second torsional damper nonelastomeric bonding surface.

2. helicopter rotor damper system as claimed in claim 1 wherein said first elastomeric torsional damper torsional elastomer has a twist plane between said first elastomeric torsional damper first torsional damper nonelastomeric bonding surface and said first elastomeric torsional damper second torsional damper nonelastomeric bonding surface, said second elastomeric torsional damper torsional elastomer has a twist plane between said second elastomeric torsional damper first torsional damper nonelastomeric bonding surface and said second elastomeric torsional damper second torsional damper nonelastomeric bonding surface.

3. helicopter rotor damper system as claimed in claim 1 wherein said first elastomeric torsional damper first torsional damper nonelastomeric bonding surface has a nonelastomeric support structure, said first elastomeric torsional damper first torsional damper nonelastomeric bonding surface nonelastomeric support structure having a nonelastomeric support structure twist plane, said first elastomeric torsional damper second torsional damper nonelastomeric bonding surface has a nonelastomeric support structure, said first elastomeric torsional damper second torsional damper nonelastomeric bonding surface nonelastomeric support structure having a nonelastomeric support structure twist plane, said second elastomeric torsional damper first torsional damper nonelastomeric bonding surface has a nonelastomeric support structure, said second elastomeric torsional damper first torsional damper nonelastomeric bonding surface nonelastomeric support structure having a nonelastomeric support structure twist plane, said second elastomeric torsional damper second torsional damper nonelastomeric bonding surface has a nonelastomeric support structure, said second elastomeric torsional damper second torsional damper nonelastomeric bonding surface nonelastomeric support structure having a nonelastomeric support structure twist plane.

4. helicopter rotor damper system as claimed in claim 1 including: a third elastomeric torsional damper, said third elastomeric torsional damper having a third elastomeric torsional damper torsional elastomer bonded between a third elastomeric torsional damper first torsional damper nonelastomeric bonding surface and a third elastomeric torsional damper second torsional damper nonelastomeric bonding surface, a fourth elastomeric torsional damper, said fourth elastomeric torsional damper having a fourth elastomeric torsional damper torsional elastomer bonded between a fourth elastomeric torsional damper first torsional damper nonelastomeric bonding surface and a fourth elastomeric torsional damper second torsional damper nonelastomeric bonding surface.

5. helicopter rotor damper system as claimed in claim 1 wherein said damper link is a longitudinally extending link, said longitudinally extending link having a longitudinal link axis with said link having a first linkend and a distal second link end.

6. helicopter rotor damper system as claimed in claim 5 wherein said first linkend is comprised of a nonelastomeric outer link housing member, said linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims.

7. helicopter rotor damper system as claimed in claim 5 wherein said second linkend is comprised of a nonelastomeric outer link housing member, said linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims.

8. helicopter rotor damper system as claimed in claim 1 wherein said damper centering bearing is comprised of a nonelastomeric outer centering bearing housing member, having a centering bearing housing cavity with a cavity inner circumferential bonding surface, and a centering bearing nonelastomeric inner member contained in said centering bearing housing cavity, said centering bearing nonelastomeric inner member having an outer circumferential bonding surface, and a centering bearing elastomeric intermediate having an outer circumferential elastomeric bonding surface and an inner circumferential elastomeric bonding surface, said outer circumferential elastomeric bonding surface bonded to said cavity inner circumferential bonding surface and said inner circumferential elastomeric bonding surface bonded to said outer circumferential bonding surface.

9. helicopter rotor damper system as claimed in claim 8 wherein said damper centering bearing elastomeric intermediate contains at least a first nonelastomeric shim.

10. helicopter rotor damper system as claimed in claim 8 wherein said first elastomeric torsional damper torsional elastomer and said second elastomeric torsional damper torsional elastomer are comprised of a first elastomer and said damper centering bearing elastomeric intermediate is comprised of a second elastomer.

11. helicopter rotor damper system as claimed in claim 1 wherein said first elastomeric torsional damper first torsional damper nonelastomeric bonding surface rotate relative to said first elastomeric torsional damper second torsional damper nonelastomeric bonding surface about said damper center of rotation axis in a damper rotation in the range from a negative thirty degrees through a positive thirty degrees, and said second elastomeric torsional damper first torsional damper nonelastomeric bonding surface rotate relative to said second elastomeric torsional damper second torsional damper nonelastomeric bonding surface about said damper center of rotation axis with the damper rotation in the range from the negative thirty degrees through the positive thirty degrees.

12. helicopter rotor damper system as claimed in claim 1 wherein said first elastomeric torsional damper first torsional damper nonelastomeric bonding surface rotate relative to said first elastomeric torsional damper second torsional damper nonelastomeric bonding surface about said damper center of rotation axis in a damper rotation in the range from a negative thirty degrees through a positive thirty degrees, and said second elastomeric torsional damper first torsional damper nonelastomeric bonding surface rotate relative to said second elastomeric torsional damper second torsional damper nonelastomeric bonding surface about said damper center of rotation axis with the damper rotation in the range from the negative thirty degrees through the positive thirty degrees.

13. helicopter rotor damper system as claimed in claim 1 including a first cantilever connector and a second cantilever connector.

14. helicopter rotor damper system as claimed in claim 13 wherein said first cantilever connector provides a cantileved connection between said elastomeric torsional damper and said damper link.

15. helicopter rotor damper system as claimed in claim 13 wherein said second cantilever connector provides a cantileved connection between said damper link and said helicopter rotor.

16. A damper including a damper centering bearing providing a damper center of rotation axis, at least a first elastomeric torsional damper, said first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, at least a second elastomeric torsional damper, said second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, wherein said first elastomeric torsional damper first torsional damper nonelastomeric bonding surface rotate relative to said first elastomeric torsional damper second torsional damper nonelastomeric bonding surface, and said second elastomeric torsional damper first torsional damper nonelastomeric bonding surface rotate relative to said second elastomeric torsional damper second torsional damper nonelastomeric bonding surface.

17. A damper as claimed in claim 16 wherein said first elastomeric torsional damper torsional elastomer has a twist plane between said first elastomeric torsional damper first torsional damper nonelastomeric bonding surface and said first elastomeric torsional damper second torsional damper nonelastomeric bonding surface, said second elastomeric torsional damper torsional elastomer has a twist plane between said second elastomeric torsional damper first torsional damper nonelastomeric bonding surface and said second elastomeric torsional damper second torsional damper nonelastomeric bonding surface.

18. A damper as claimed in claim 16 wherein said first elastomeric torsional damper first torsional damper nonelastomeric bonding surface has a nonelastomeric support structure, said first elastomeric torsional damper first torsional damper nonelastomeric bonding surface nonelastomeric support structure having a nonelastomeric support structure twist plane, said first elastomeric torsional damper second torsional damper nonelastomeric bonding surface has a nonelastomeric support structure, said first elastomeric torsional damper second torsional damper nonelastomeric bonding surface nonelastomeric support structure having a nonelastomeric support structure twist plane, said second elastomeric torsional damper first torsional damper nonelastomeric bonding surface has a nonelastomeric support structure, said second elastomeric torsional damper first torsional damper nonelastomeric bonding surface nonelastomeric support structure having a nonelastomeric support structure twist plane, said second elastomeric torsional damper second torsional damper nonelastomeric bonding surface has a nonelastomeric support structure, said second elastomeric torsional damper second torsional damper nonelastomeric bonding surface nonelastomeric support structure having a nonelastomeric support structure twist plane.

19. A damper as claimed in claim 16 including: a third elastomeric torsional damper, said third elastomeric torsional damper having a third elastomeric torsional damper torsional elastomer bonded between a third elastomeric torsional damper first torsional damper nonelastomeric bonding surface and a third elastomeric torsional damper second torsional damper nonelastomeric bonding surface, a fourth elastomeric torsional damper, said fourth elastomeric torsional damper having a fourth elastomeric torsional damper torsional elastomer bonded between a fourth elastomeric torsional damper first torsional damper nonelastomeric bonding surface and a fourth elastomeric torsional damper second torsional damper nonelastomeric bonding surface.

20. A damper as claimed in claim 16 including a damper link interface, said damper link interface grounding a damper link to at least one of said nonelastomeric bonding surfaces.

21. A damper as claimed in claim 16 wherein said damper centering bearing is comprised of a nonelastomeric outer centering bearing housing member, having a centering bearing housing cavity with a cavity inner circumferential bonding surface, and a centering bearing nonelastomeric inner member contained in said centering bearing housing cavity, said centering bearing nonelastomeric inner member having an outer circumferential bonding surface, and a centering bearing elastomeric intermediate having an outer circumferential elastomeric bonding surface and an inner circumferential elastomeric bonding surface, said outer circumferential elastomeric bonding surface bonded to said cavity inner circumferential bonding surface and said inner circumferential elastomeric bonding surface bonded to said outer circumferential bonding surface.

22. A damper as claimed in claim 21 wherein said damper centering bearing elastomeric intermediate contains at least a first nonelastomeric shim.

23. A damper as claimed in claim 21 wherein said first elastomeric torsional damper torsional elastomer and said second elastomeric torsional damper torsional elastomer are comprised of a first elastomer and said damper centering bearing elastomeric intermediate is comprised of a second elastomer.

24. A damper as claimed in claim 16 wherein said first elastomeric torsional damper first torsional damper nonelastomeric bonding surface rotate relative to said first elastomeric torsional damper second torsional damper nonelastomeric bonding surface about said damper center of rotation axis in a damper rotation in the range from a negative thirty degrees through a positive thirty degrees, and said second elastomeric torsional damper first torsional damper nonelastomeric bonding surface rotate relative to said second elastomeric torsional damper second torsional damper nonelastomeric bonding surface about said damper center of rotation axis with the damper rotation in the range from the negative thirty degrees through the positive thirty degrees.

25. A damper as claimed in claim 16 wherein said first elastomeric torsional damper first torsional damper nonelastomeric bonding surface rotate relative to said first elastomeric torsional damper second torsional damper nonelastomeric bonding surface about said damper center of rotation axis in a damper rotation in the range from a negative thirty degrees through a positive thirty degrees, and said second elastomeric torsional damper first torsional damper nonelastomeric bonding surface rotate relative to said second elastomeric torsional damper second torsional damper nonelastomeric bonding surface about said damper center of rotation axis with the damper rotation in the range from the negative thirty degrees through the positive thirty degrees.

26. An aircraft link system, said aircraft link system including: a longitudinally extending link, said longitudinally extending link having a longitudinal link axis with said extending link having a first linkend and a distal second linkend, said first linkend is comprised of a nonelastomeric outer link housing member, said first linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims, and a first cantilever connector providing a cantileved connection between said first linkend nonelastomeric inner member and a first aircraft member.

27. An aircraft link system as claimed in claim 26 wherein said second linkend is comprised of a nonelastomeric outer link housing member, said second linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims, and a second cantilever connector providing a cantileved connection between said second linkend nonelastomeric inner member and a second aircraft member.

28. An aircraft link system as claimed in claim 26 wherein said first aircraft member is a damper.

29. An aircraft link system as claimed in claim 26 wherein said second aircraft member is a rotor.

30. A method of making a damper system, said method including: providing a damper centering bearing providing a damper center of rotation axis, providing at least a first elastomeric torsional damper, said first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, providing at least a second elastomeric torsional damper, said second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, centering said at least a first elastomeric torsional damper and said at least a second elastomeric torsional damper to rotate about said damper center of rotation axis, providing a damper link interface, connecting said damper link with said at least first elastomeric torsional damper and said at least second elastomeric torsional damper, and second elastomeric torsional damper first torsional damper nonelastomeric bonding surface rotating relative to said second elastomeric torsional damper second torsional damper nonelastomeric bonding surface.

31. A method as claimed in claim 30 wherein said first elastomeric torsional damper torsional elastomer has a twist plane between said first elastomeric torsional damper first torsional damper nonelastomeric bonding surface and said first elastomeric torsional damper second torsional damper nonelastomeric bonding surface, said second elastomeric torsional damper torsional elastomer has a twist plane between said second elastomeric torsional damper first torsional damper nonelastomeric bonding surface and said second elastomeric torsional damper second torsional damper nonelastomeric bonding surface.

32. A method as claimed in claim 30 wherein said first elastomeric torsional damper first torsional damper nonelastomeric bonding surface has a nonelastomeric support structure, said first elastomeric torsional damper first torsional damper nonelastomeric bonding surface nonelastomeric support structure having a nonelastomeric support structure twist plane, said first elastomeric torsional damper second torsional damper nonelastomeric bonding surface has a nonelastomeric support structure, said first elastomeric torsional damper second torsional damper nonelastomeric bonding surface nonelastomeric support structure having a nonelastomeric support structure twist plane, said second elastomeric torsional damper first torsional damper nonelastomeric bonding surface has a nonelastomeric support structure, said second elastomeric torsional damper first torsional damper nonelastomeric bonding surface nonelastomeric support structure having a nonelastomeric support structure twist plane, said second elastomeric torsional damper second torsional damper nonelastomeric bonding surface has a nonelastomeric support structure, said second elastomeric torsional damper second torsional damper nonelastomeric bonding surface nonelastomeric support structure having a nonelastomeric support structure twist plane.

33. A method as claimed in claim 30 including: providing a third elastomeric torsional damper, said third elastomeric torsional damper having a third elastomeric torsional damper torsional elastomer bonded between a third elastomeric torsional damper first torsional damper nonelastomeric bonding surface and a third elastomeric torsional damper second torsional damper nonelastomeric bonding surface, and providing a fourth elastomeric torsional damper, said fourth elastomeric torsional damper having a fourth elastomeric torsional damper torsional elastomer bonded between a fourth elastomeric torsional damper first torsional damper nonelastomeric bonding surface and a fourth elastomeric torsional damper second torsional damper nonelastomeric bonding surface.

34. A method as claimed in claim 30 wherein said damper link is a longitudinally extending link, said longitudinally extending link having a longitudinal link axis with said damper link having a first linkend and a distal second link end.

35. A method as claimed in claim 34 wherein said first linkend is comprised of a nonelastomeric outer link housing member, said linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims.

36. A method as claimed in claim 34 wherein said second linkend is comprised of a nonelastomeric outer link housing member, said linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims.

37. A method as claimed in claim 30 wherein said damper centering bearing is comprised of a nonelastomeric outer centering bearing housing member, having a centering bearing housing cavity with a cavity inner circumferential bonding surface, and a centering bearing nonelastomeric inner member contained in said centering bearing housing cavity, said centering bearing nonelastomeric inner member having an outer circumferential bonding surface, and a centering bearing elastomeric intermediate having an outer circumferential elastomeric bonding surface and an inner circumferential elastomeric bonding surface, said outer circumferential elastomeric bonding surface bonded to said cavity inner circumferential bonding surface and said inner circumferential elastomeric bonding surface bonded to said outer circumferential bonding surface.

38. A method as claimed in claim 37 wherein said damper centering bearing elastomeric intermediate contains at least a first nonelastomeric shim.

39. A method as claimed in claim 37 wherein said first elastomeric torsional damper torsional elastomer and said second elastomeric torsional damper torsional elastomer are comprised of a first elastomer and said damper centering bearing elastomeric intermediate is comprised of a second elastomer.

40. A method damper as claimed in claim 30 wherein said first elastomeric torsional damper first torsional damper nonelastomeric bonding surface rotate relative to said first elastomeric torsional damper second torsional damper nonelastomeric bonding surface about said damper center of rotation axis in a damper rotation in the range from a negative thirty degrees through a positive thirty degrees, and said second elastomeric torsional damper first torsional damper nonelastomeric bonding surface rotate relative to said second elastomeric torsional damper second torsional damper nonelastomeric bonding surface about said damper center of rotation axis with the damper rotation in the range from the negative thirty degrees through the positive thirty degrees.

41. A method as claimed in claim 30 including providing a first cantilever connector for connecting said damper link with said at least first elastomeric torsional damper and said at least second elastomeric torsional damper.

42. A method as claimed in claim 30 including providing a second cantilever connector for providing a cantileved connection between said damper link and a helicopter rotor.

43. A method of controlling a motion, said method including: providing a damper, said damper including a damper centering bearing providing a damper center of rotation axis, at least a first elastomeric torsional damper, said first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, and at least a second elastomeric torsional damper, said second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, said at least first elastomeric torsional damper and said at least second elastomeric torsional damper rotating about said damper center of rotation axis, providing a damper link interface, connecting said damper link with said damper wherein said first elastomeric torsional damper first torsional damper nonelastomeric bonding surface rotates relative to said first elastomeric torsional damper second torsional damper nonelastomeric bonding surface about said damper center of rotation axis, and said second elastomeric torsional damper first torsional damper nonelastomeric bonding surface rotates relative to said second elastomeric torsional damper second torsional damper nonelastomeric bonding surface about said damper center of rotation axis.

44. A method as claimed in claim 43 wherein said first elastomeric torsional damper torsional elastomer has a twist plane between said first elastomeric torsional damper first torsional damper nonelastomeric bonding surface and said first elastomeric torsional damper second torsional damper nonelastomeric bonding surface, said second elastomeric torsional damper torsional elastomer has a twist plane between said second elastomeric torsional damper first torsional damper nonelastomeric bonding surface and said second elastomeric torsional damper second torsional damper nonelastomeric bonding surface.

45. A method as claimed in claim 43 wherein said first elastomeric torsional damper first torsional damper nonelastomeric bonding surface has a nonelastomeric support structure, said first elastomeric torsional damper first torsional damper nonelastomeric bonding surface nonelastomeric support structure having a nonelastomeric support structure twist plane, said first elastomeric torsional damper second torsional damper nonelastomeric bonding surface has a nonelastomeric support structure, said first elastomeric torsional damper second torsional damper nonelastomeric bonding surface nonelastomeric support structure having a nonelastomeric support structure twist plane, said second elastomeric torsional damper first torsional damper nonelastomeric bonding surface has a nonelastomeric support structure, said second elastomeric torsional damper first torsional damper nonelastomeric bonding surface nonelastomeric support structure having a nonelastomeric support structure twist plane, said second elastomeric torsional damper second torsional damper nonelastomeric bonding surface has a nonelastomeric support structure, said second elastomeric torsional damper second torsional damper nonelastomeric bonding surface nonelastomeric support structure having a nonelastomeric support structure twist plane.

46. A method as claimed in claim 43 including: providing a third elastomeric torsional damper, said third elastomeric torsional damper having a third elastomeric torsional damper torsional elastomer bonded between a third elastomeric torsional damper first torsional damper nonelastomeric bonding surface and a third elastomeric torsional damper second torsional damper nonelastomeric bonding surface, and providing a fourth elastomeric torsional damper, said fourth elastomeric torsional damper having a fourth elastomeric torsional damper torsional elastomer bonded between a fourth elastomeric torsional damper first torsional damper nonelastomeric bonding surface and a fourth elastomeric torsional damper second torsional damper nonelastomeric bonding surface.

47. A method as claimed in claim 43 wherein said damper link is a longitudinally extending link, said longitudinally extending link having a longitudinal link axis with said damper link having a first linkend and a distal second link end.

48. A method as claimed in claim 47 wherein said first linkend is comprised of a nonelastomeric outer link housing member, said linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims.

49. A method as claimed in claim 47 wherein said second linkend is comprised of a nonelastomeric outer link housing member, said linkend having a linkend cavity with a linkend cavity inner circumferential bonding surface, and a linkend nonelastomeric inner member contained in said linkend cavity, said linkend nonelastomeric inner member having a linkend outer circumferential bonding surface, and a linkend elastomeric intermediate having an outer circumferential elastomeric bonding surface and an inner circumferential elastomeric bonding surface, said outer circumferential elastomeric bonding surface bonded to said linkend cavity inner circumferential bonding surface and said inner circumferential elastomeric bonding surface bonded to said linkend outer circumferential bonding surface, said elastomeric intermediate containing a plurality of bonded nonelastomeric shims.

50. A method as claimed in claim 43 wherein said damper centering bearing is comprised of a nonelastomeric outer centering bearing housing member, having a centering bearing housing cavity with a cavity inner circumferential bonding surface, and a centering bearing nonelastomeric inner member contained in said centering bearing housing cavity, said centering bearing nonelastomeric inner member having an outer circumferential bonding surface, and a centering bearing elastomeric intermediate having an outer circumferential elastomeric bonding surface and an inner circumferential elastomeric bonding surface, said outer circumferential elastomeric bonding surface bonded to said cavity inner circumferential bonding surface and said inner circumferential elastomeric bonding surface bonded to said outer circumferential bonding surface.

51. A method as claimed in claim 50 wherein said damper centering bearing elastomeric intermediate contains at least a first nonelastomeric shim.

52. A method as claimed in claim 50 wherein said first elastomeric torsional damper torsional elastomer and said second elastomeric torsional damper torsional elastomer are comprised of a first elastomer and said damper centering bearing elastomeric intermediate is comprised of a second elastomer.

53. A method as claimed in claim 43 wherein said first elastomeric torsional damper first torsional damper nonelastomeric bonding surface rotate relative to said first elastomeric torsional damper second torsional damper nonelastomeric bonding surface about said damper center of rotation axis in a damper rotation in the range from a negative twenty five degrees through a positive twenty five degrees, and said second elastomeric torsional damper first torsional damper nonelastomeric bonding surface rotate relative to said second elastomeric torsional damper second torsional damper nonelastomeric bonding surface about said damper center of rotation axis with the damper rotation in the range from the negative twenty five degrees through the positive twenty five degrees.

54. A method as claimed in claim 43 including providing a first cantilever connector for connecting said damper link with said at least first elastomeric torsional damper and said at least second elastomeric torsional damper.

55. A method as claimed in claim 43 including providing a second cantilever connector for providing a cantilevered connection between said damper link and a vehicle rotor.

56. A damper system for damping a motion of a moving member, said damper system including: a torsional damper with a means for providing a damper center of rotation axis, at least a first elastomeric torsional damper, said first elastomeric torsional damper having a first elastomeric torsional damper torsional elastomer bonded between a first elastomeric torsional damper first torsional damper nonelastomeric bonding surface and a first elastomeric torsional damper second torsional damper nonelastomeric bonding surface, at least a second elastomeric torsional damper, said second elastomeric torsional damper having a second elastomeric torsional damper torsional elastomer bonded between a second elastomeric torsional damper first torsional damper nonelastomeric bonding surface and a second elastomeric torsional damper second torsional damper nonelastomeric bonding surface, and a means for linking said torsional damper with said moving member, wherein said torsional damper is connected with said moving member with said first elastomeric torsional damper first torsional damper nonelastomeric bonding surface rotating relative to said first elastomeric torsional damper second torsional damper nonelastomeric bonding surface, and said second elastomeric torsional damper first torsional damper nonelastomeric bonding surface rotating relative to said second elastomeric torsional damper second torsional damper nonelastomeric bonding surface.

* * * * *